US012280933B2

(12) United States Patent
Freeman

(10) Patent No.: US 12,280,933 B2
(45) **Date of Patent: *Apr. 22, 2025**

(54) PACKING PRODUCT, USES, AND METHOD OF MANUFACTURE

(71) Applicant: Brandon D. Freeman, Columbus, IN (US)

(72) Inventor: Brandon D. Freeman, Columbus, IN (US)

( * ) Notice: Subject to any disclaimer, the term of this patent is extended or adjusted under 35 U.S.C. 154(b) by 92 days.

This patent is subject to a terminal disclaimer.

(21) Appl. No.: 18/094,241

(22) Filed: Jan. 6, 2023

(65) Prior Publication Data

US 2023/0159253 A1 May 25, 2023

Related U.S. Application Data

(63) Continuation-in-part of application No. 17/573,058, filed on Jan. 11, 2022.

(60) Provisional application No. 63/135,820, filed on Jan. 11, 2021.

(51) Int. Cl.
*B65D 81/09* (2006.01)
*B31D 5/00* (2017.01)

(52) U.S. Cl.
CPC ........... *B65D 81/09* (2013.01); *B31D 5/0052* (2013.01); *B31D 5/006* (2013.01); *B65D 2565/385* (2013.01)

(58) Field of Classification Search
CPC .. B65D 81/09; B65D 2565/385; B65D 81/05; B31D 5/0052; B31D 5/006; B31D 2205/0023; B31D 2205/0047; B31D 2205/0058; B31D 5/0069; B31C 1/02; B31C 3/00
See application file for complete search history.

(56) References Cited

U.S. PATENT DOCUMENTS

| | | | | |
|---|---|---|---|---|
| 4,937,131 | A | 6/1990 | Baldacci et al. | |
| 5,468,556 | A * | 11/1995 | Fuss | B29C 69/001 428/218 |
| 6,626,813 | B1 | 9/2003 | Ratzel et al. | |
| 2002/0040859 | A1 * | 4/2002 | Weder | B65D 81/09 206/423 |

(Continued)

FOREIGN PATENT DOCUMENTS

| | | | |
|---|---|---|---|
| WO | 1991018807 | A1 | 12/1991 |
| WO | 2006081355 | A1 | 8/2006 |

*Primary Examiner* — Patricia L. Nordmeyer
(74) *Attorney, Agent, or Firm* — Bruce J. Bowman

(57) ABSTRACT

A packing product, its use, a machine for production of the packing product, and a method of manufacture, creates a double curl, “B” or modified “B” having elastic, cushioning, form-fitting, and coherent packing properties. The “B” is created from a dimension-controlled strip of preferably, but not necessarily, cohesive paper having a cohesive side and a non-cohesive side, a leading end, and a trailing end. The leading edge is wound into a spiral in a first direction with the cohesive side of the dimension-controlled cohesive paper facing outward, while the trailing edge is wound into a spiral in a second direction that is opposite the first direction, with the cohesive side of the cohesive paper also facing outward. A plurality of “B”s provide a clumped, cohesive mass around a packed item. The machine can produce “B”s of various sizes to accommodate various sized items and/or packaging.

6 Claims, 17 Drawing Sheets

(56) References Cited

U.S. PATENT DOCUMENTS

| | | | |
|---|---|---|---|
| 2008/0153685 A1 | 6/2008 | Cheich et al. | |
| 2008/0210591 A1 | 9/2008 | Cheich | |
| 2009/0247382 A1 | 10/2009 | Bussey, III et al. | |
| 2020/0148445 A1 | 5/2020 | Timmers et al. | |
| 2022/0219878 A1 | 7/2022 | Freeman | |

* cited by examiner

PACKING PRODUCT, USES, AND METHOD OF MANUFACTURE

CROSS-REFERENCE TO RELATED APPLICATIONS

This U.S. non-provisional patent application is a continuation-in-part of U.S. non-provisional patent application Ser. No. 17/573,058 filed Jan. 11, 2022 titled Packing Material, Use, and Methods of Manufacture, which claims the benefit of and/or priority under 35 U.S.C. § 119 (e) to U.S. provisional patent application Ser. No. 63/135,820 filed Jan. 11, 2021 titled Packing Material and Method of Manufacture, the entire contents of each of which is specifically incorporated herein by reference.

FIELD OF THE INVENTION

The present invention relates to packing products and, more particularly, to sustainable, re-usable, and efficient packing products for protecting packaged items.

BACKGROUND OF THE INVENTION

A significant number of items are shipped throughout the world every day. The growth of on-line purchasing has increased shipping tremendously. However, merchandise damaged during transit creates lost revenue for the vendor, the shipper, and frustration for the recipient. It is thus beneficial to the shipper, the merchant, and the recipient that the shipped items arrive undamaged. Items are shipped to a consumer via box, envelope, or other style of container. To try and ensure items do not get damaged during transit, dunnage or packing material is typically used to bundle the item(s) for shipping.

Heretofore, various types of low density packing materials have been used. Plastic "peanuts", plastic balls, plastic bubble-wrap, plastic air-filled "pillows," form-fitting foam, straw and straw-like material have been or are being used as packing material. Most if not all of these packing materials have drawbacks. Plastic and similar materials are bad for the environment because they are generally not biodegradable and toxic to wildlife. The use of many, small pieces of low density packing material (e.g. Styrofoam balls, or peanuts), while efficient to surround and retain packed items, creates unpacking problems. Air-filled pillows do not effectively bundle items, allowing for gaps within the packaging. Such prior art packing material creates other problems as well.

In view of the above, it is evident that paper packing material would be preferred over other types of packing material since paper is biodegradable, recyclable, sustainable, and low density. However, lengths of crumpled or twisted paper, clumps of paper, or shredded paper is not practical for wrapping items, or for large-scale packaging.

Several patents and/or patent publications provide various ways of converting paper into a low density packing or cushioning product since paper converted into a low density packing or cushioning product is generally practical for packing. For example, U.S. Pat. No. 6,626,813 discloses a cushioning conversion system and method for making a coil of cushioning product from a sheet of paper. FIG. 6 of U.S. Pat. No. 6,626,813 shows the produced coil of cushioning product (the '813 coil), the '813 coil having a width the size of the sheet of paper. The size of the '813 coil makes it impractical to form the coils into adequate packing material that can cushion around variously-shaped items without much manipulating of the '813 coil or cutting them. This adds an additional packing step. U.S. Patent Publication No. 2008/0153685 discloses a method of making a dunnage (packing) product from a continuous length of stock material having a cohesive on at least one surface. The dunnage product is a large coil of crumpled paper (the '685 coil) that uses its cohesiveness to keep its crumpled and coiled shape. Like the '813 coil, the '685 coil makes it impractical to form the coils into adequate packing material that can cushion around variously-shaped items without much manipulating of the '685 coil—adding an additional packing step. Moreover, the '813 and '685 coils are not able to form a generally amalgamated mass and/or a cohesive mass around an item or items for packing, creating only a loose assemblage of paper that can shift and move during transit. Without limitation, such prior art packing products are either too large, not easily formable around items of various sizes and shapes, and/or do not easily conform in shape to the interior of the items' packaging.

In view of the above, it would therefore be desirable to have a paper-based packing product that alleviates the shortcomings of the prior art. It would be further desirable to have a paper-based packing product formed to provide adequate volume filler as a package/packaging without being a solid mass. It would be still further desirable to have a paper-based packing product formed to provide structural integrity with a lesser amount of material than a solid mass. It would be moreover desirable that the paper-based packing product clump or bunch together to create a packing mass about an item or items for packing. It would be further desirous to have a paper-based packing product formed by a single or double curl or spiral of cohesive paper wherein the cohesive portion of the paper is on the outside of the curl/spiral (i.e., faces radially outward). It would therefore be even further desirous to have a paper-based packing product of individual curls/spirals that forms a generally cohesive mass about an item or items for packing. The present invention addresses the above issues.

SUMMARY OF THE INVENTION

A paper-based packing product, use, machine and method of manufacture is provided that affords protection of packed/packaged items.

In one form, the packing product is fashioned as a curl or spiral (collectively, curl) from a dimension controlled, spiraled/wound strip of cohesive paper having a cohesive side and a non-cohesive side and formed with a leading end that is bent upon itself such that a cohesive side of the leading end contacts the cohesive side of the dimension controlled strip of cohesive paper, and a trailing end opposite the leading end that is bent upon itself such that a non-cohesive side of the trailing end contacts the non-cohesive side of the dimensioned strip of cohesive paper, wherein the dimensioned strip of cohesive paper is spiraled or wound into a curl or spiral with the cohesive side of the dimensioned strip of cohesive paper on the outside of the curl/spiral.

A plurality of the present curls provides a generally cohesive mass or clump around an item or items in packing due to the curls loosely adhering to one another. The curls may also loosely adhere to the item or items. A method of packing an item or items includes placing a plurality of the present packing curls into a package with the item or items. The method may include providing a plurality of curls dimensioned and sized according to the item or items being packed. Smaller items may use smaller curls while large items may use larger curls, or vice versa. A mix of curl sizes may be used.

A curl may be formed from roll of cohesive paper that is dimensioned into a strip of cohesive paper having a width that is preferably, but not necessarily, one quarter inch (¼") to three quarters inch (¾"), with one half inch (½") being most preferable, and preferably, but not necessarily, two inches (2") to six inches (6") long. Other sizes are contemplated and may depend on the size of the item or items being packed. The cohesive paper has a weight that is preferably, but not necessarily, from the teens to the fifties. The width or vertical side of a curl provides blocking/stack strength for the packaged item, while the size of the curl (length or horizontal side) provides cushioning for the packaged item. When a plurality of curls are clumped together in random directions, a protectant mass is formed around an item or items by interaction of the cohesive nature of the cohesive paper of each curl with respect to other curls. A mass of curls can assume any size and shape, especially around a packaged item, such as in a corrugated box.

The curls can be used for single or multiple, light or heavy items. The curls may also be used in conjunction with an item or items wrapped in cohesive paper. With the cohesive side of the paper placed on the outside of the item or items, the curls surround the item or items to stabilize as well as protect the item(s). Such packing also keeps the item(s) free from abrasion. Other types of cohesive wrapping such as, but not limited to, foam may be used in place of cohesive paper wrapping.

The curl producing machine may be sized according to application need. For instance, a small desktop curl producing machine may be used for packing small boxes, while a larger, free-standing curl producing machine may be used for packing larger boxes. Curl producing machines may be fashioned for low volume curl production or high volume curl production.

A method and machine of producing a curl includes providing a roll of a cohesive paper sheet having a cohesive side and a non-cohesive side, cutting the cohesive paper sheet into a dimensioned strip, creating a folded leading end on the dimensioned strip that is bent upon itself such that a cohesive side of the leading end adheres to the cohesive side of the dimensioned strip of cohesive paper, creating a trailing end on the dimensioned strip opposite the leading end that is bent upon itself such that a non-cohesive side of the trailing end contacts the non-cohesive side of the dimensioned strip of cohesive paper, and winding/spiraling and cutting the dimensioned and end folded strip of cohesive paper into a curl or spiral with the cohesive side of the dimensioned and end folded strip of cohesive paper on the outside. Cutting of the strips may occur before winding, after winding, or in conjunction with winding.

A method of and machine for packing or cushioning one or more items includes providing a plurality of the present curls or spirals around or about the one or more items, with or without the item(s) first being swathed in a cohesive wrapper. The plurality of curls are preferably, but not necessarily, dimensioned and sized according to the item or items being packed. Smaller items may use smaller curls while large items may use larger curls, or vice versa. A mix of curl sizes may be used. The present machines for producing the curls are adjustable to provide different lengths of curls, width, etc. for different packing needs.

Different cohesive papers may be used for the curls. The cohesive paper may be have a color, be different weights, or have texturing.

In another form, the packing product is fashioned as a double curl, either a "B" or modified "B" (collectively, "B"), from a dimension controlled strip of paper. The strip of paper may be cohesive paper having a cohesive side and a non-cohesive side, a coated paper, or the like. The "B" is formed by a first curl wound or spiraled about a first end of the dimensioned controlled strip of paper, and a second curl wound or spiraled about a second end of the dimensioned controlled strip of paper. A small portion of the dimension controlled strip of paper connects the first and second curls. The first and second curls are wound or spiraled in opposite directions. If cohesive paper is used, the first and second curls are formed such that the cohesive side is/faces radially outward (outside) and the non-cohesive side is/faces radially inward (inside).

A plurality of "B"s provide a generally unified mass or clump around an item or items within (packed) in a receptacle (for example, but not limited to, and interchangeably herewith, a package, container, box, envelope, case, carton, basket, chest, drawer, packet, canister, can, or the like). In the case of the use of cohesive paper to form the "B"s, a plurality of cohesive "B"s provide a unified cohesive mass or clump around an item or items in a receptacle due to the cohesive "B"s loosely adhering to one another. The cohesive "B"s of the unified cohesive clump may also loosely adhere to the item or items, as well as the interior of the receptacle. A mass or clump may be compressed to reduce its volume and/or provide tighter packing. Mass or clump reduction may also be used to create or provide blocking or bracing of items within a receptacle. "B"s are moldable and fit the form of the item(s) being packed/packaged.

A method of packing an item or items using the present invention includes placing a plurality of the present "B"s in a receptacle (e.g. a packing container) along with the item or items. The "B"s may be cohesive "B"s or not (collectively "B"s unless indicated specifically as being cohesive or non-cohesive). The method may include providing a plurality of "B"s dimensioned and sized according to the item or items being packed, size of the receptacle, weight of the item or items being packed, or other parameter/consideration. Smaller and/or lighter items may use smaller "B"s while larger and/or heavier items may use larger "B"s, or vice versa. A mix of different sized "B"s may be used. Other considerations, characteristics, and/or factors may determine dimensions or influence specifics of the "B"s. "B"s may be used for large, medium, or small items/receptacles, as well as light, medium, or heavy items/receptacles.

In one form, a "B" is formed from a roll or other source of paper (cohesive, non-cohesive, or a cohesive/non-cohesive blend, coated or the like) that is dimensioned controlled into a strip of paper having a width that is preferably, but not necessarily, one quarter inch (¼") to three quarters inch (¾"), with one half inch (½") being most preferable, and preferably, but not necessarily, two inches (2") to twelve inches (12") long. Other sizes are contemplated and may depend on factors and/or characteristics of the item or items being packed. The paper preferably, but not necessarily, has a weight from the teens to the fifties. The width or vertical side of a "B" provides blocking/stack strength for the packaged item(s), while the radial size or diameter of the first and second curls of the "B" provides cushioning as well as other benefits for the packaged item. When a plurality of "B"s are clumped together in random directions, a protectant mass is formed around an item or items by interaction of the shape of the curls of each "B" and, when cohesive paper forms the "B"s, "B"s naturally additionally adhere to one or another due to the cohesive side of each "B" faces outward. A mass of "B"s can assume any size and shape, especially around a packaged item, such as in a corrugated box. The mass also forming well inside the corrugated box. The "B"s surrounding the item or items stabilize as well as protect the item(s). Such packing also keeps the item(s) free from abrasion.

"B"s can be used to pack single or multiple items, light or heavy items, and within any receptacle, closed or open. "B"s may also be used in conjunction with an item or items that are wrapped in various materials such as, but not limited to, bubble wrap, tissue paper, butcher's paper, newspaper, cohesive paper, construction paper, coated paper, cotton paper, and plant paper. Other types of wrapping such as, but not limited to, foam may be used in place of paper wrapping.

The "B" producing machine may be sized according to application need. For instance, a small desktop "B" producing machine may be used for packing small boxes, while a larger, free-standing "B" producing machine may be used for packing larger boxes. "B" producing machines may be fashioned for low volume "B" production or high volume "B" production.

A method of and machine for producing the present "B"s includes providing a roll of paper (i.e. a roll of a continuous sheet of paper), forming a first curl of a first diameter at the leading end of the roll of paper, cutting the roll of paper into a strip of paper having the first curl to provide the strip of paper with a trailing end distal the first curl, then forming a second curl of a second diameter at the trailing end of the strip of paper. If cohesive paper (e.g. paper with a cohesive on one face or side thereof) is used, the first and second curls are formed with the cohesive side facing radially outward.

In one exemplary form, a machine/method for producing the present "B"s uses a roll of paper to continuously create "B"s, preferably, but not necessarily, automatically, with pre-set dimension control of the produced "B"s. The present "B" producing machine is preferably, but not necessarily, processor controlled (e.g. computer) that at least provides control of the various components of the machine. The processor may also allow custom or on-the-fly creation of "B"s by dimension control including, but not limited to, the spiral length (amount) of each curl, the width of the strip of paper and each curl, the tightness of each curl (spiral), the length of connection between the first and second curls, and the like.

In the exemplary form of the machine/method for producing the present "B"s, the sheet paper is fed through a first slot of a first slotted spindle or rod then a second slot of a second slotted spindle or rod, rotating the second slotted spindle in a first rotational direction to wind the leading end of the roll of sheet paper into a first curl, cutting the roll of sheet paper at a location before the second slotted spindle to create a strip of paper with a trailing end distal the first curl, rotating the first slotted spindle in a second rotational direction that is opposite the first rotational direction to wind the trailing end of the strip of sheet paper into a second curl, and ejecting the produced "B" from the first and second slotted spindles/machine. Variations are contemplated. Other steps not specifically mentioned in this paragraph may intervene per the present principles and specification. The roll of sheet paper may be further dimensionally controlled by cutting the roll of sheet paper into one or more widths. Other dimensions may be changed.

A method of and machine for packing or cushioning one or more items within a packing container or receptacle includes providing a machine to produce a plurality of the present "B"s, then placing them around or about the one or more items, with or without the item(s) first being wrapped. The plurality of "B"s are preferably, but not necessarily, dimensioned and sized according to the item or items being packed and/or receptacle particulars. Smaller items may use smaller "B"s while large items may use larger "B"s, or vice versa. A mix of various sized "B"s may be used. The present machines for producing the "B"s are adjustable to provide different lengths of "B"s, width, etc. for different packing needs.

Different papers may be used for the "B"s. The paper may be have a color, pattern, be different weights, have texturing or the like.

The present packing product is advantageous by providing efficient packing and/or cushioning of an item or items in a receptacle without necessarily filling the entire cavity of the receptacle. For instance, the present packing product does not need to fill the interior corners of a receptacle as it clumps around the item(s) in the receptacle. This cuts down on the amount of necessary packing product.

Further, the present packing product is lightweight. Moreover, the volume of the present packing product is not solid. It encompasses air between its curls.

The present "B"s provide a simple solution for multiple packing/packaging needs such as general void fill, protective void fill, general cushioning, light duty cushioning, heavy duty cushioning, blocking and bracing, decoratively, and containment. The present "B"s are also sustainable, reusable and/or recyclable by the consumer and in the supply chain, reusable by the same business, and end user reusable.

The present "B"s are easy and simple to use, provide for faster packing/packaging (which is a reduction in labor), allows the use of less material to pack/package items over conventional/prior art packing product. Use of the present "B"s can replace plastic and foam packing, result in reduction of packed/packaged item damage, and provide a positive customer experience.

Items as delicate or fragile as glass ornaments of any shape up to items of any practical weight and shape can be packed using the present "B"s, particularly when the "B"s have been custom produced regarding their curl size (number of turns).

Further aspects of the present invention will become apparent from consideration of the drawings and the following description of forms of the present invention. A person skilled in the art will realize that other forms of the invention are possible and that the details of the invention can be modified in a number of respects without departing from the inventive concept. The following drawings and description are to be regarded as illustrative in nature and not restrictive.

BRIEF DESCRIPTION OF THE FIGURES

The present invention and its features will be better understood by reference to the accompanying illustrations/drawings, wherein.

Figure 1:
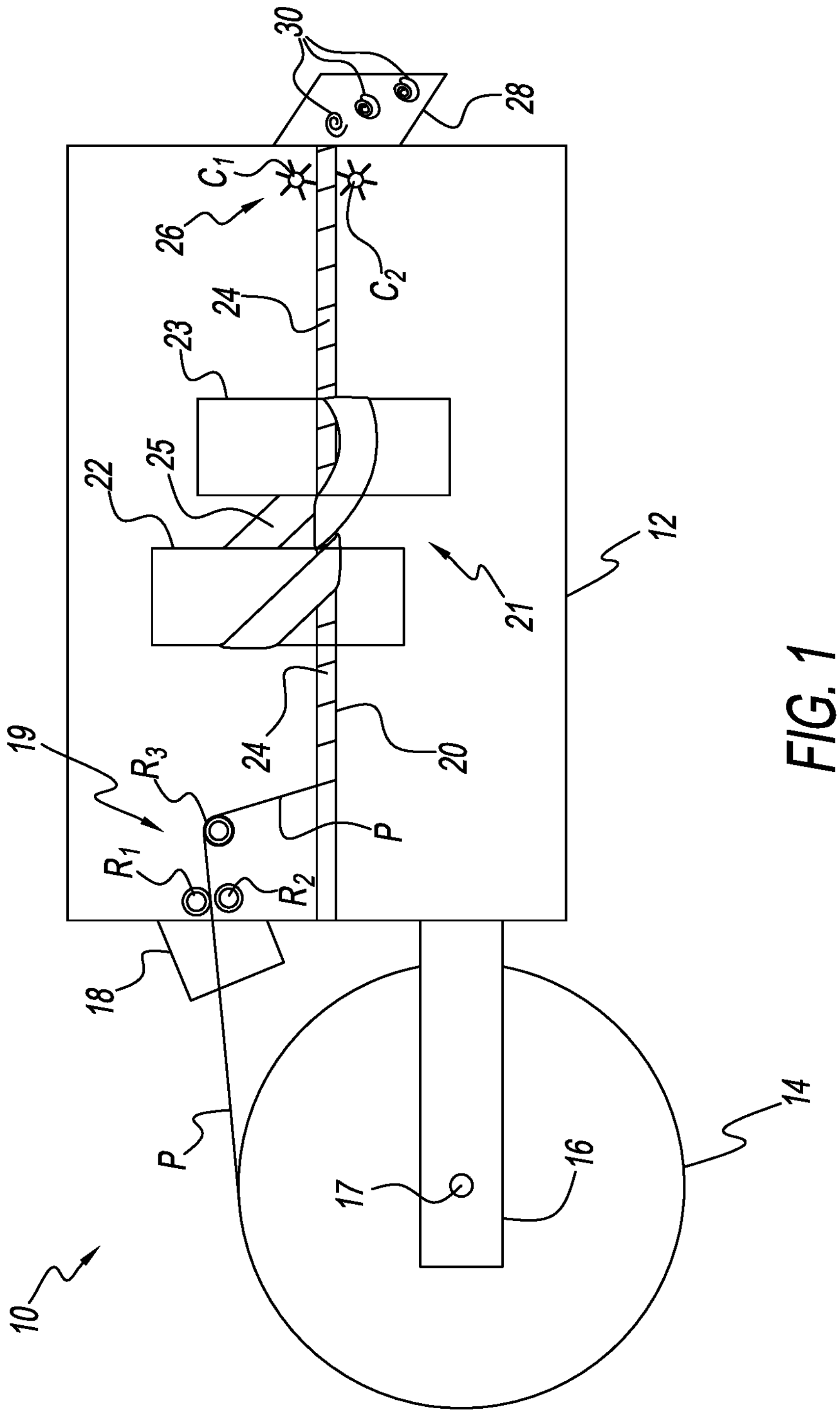
FIG. 1 is diagrammatic view of an exemplary machine for producing packing curls (curls) from a supply of cohesive paper in accordance with the principles of the present invention.

For the purposes of promoting an understanding of the principles of this invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

DETAILED DESCRIPTION OF THE INVENTION

Referring to FIG. 1, there is shown a diagrammatic view of an exemplary machine, mechanism, apparatus or the like (collectively, machine) 10 for producing one form of curls 30 in accordance with the present principles. It should be understood that the machine 10 of FIG. 1 depicts only basic components and/or features for producing the curls 30. The machine 10 has a housing 12 to which is connected a paper holder 16. A roll of cohesive paper 14 (cohesive paper being paper with a cohesive on one side only) is held by the paper holder 16 such that the roll of cohesive paper 14 may freely rotate about an axle 17 of the paper holder 16. The paper holder 16 is configured to allow various sizes (length and width) of rolls of cohesive paper to be retained. The paper holder 16 is also configured to allow replacement of cohesive paper rolls.

Cohesive paper (a continuous cohesive paper sheet), collectively cohesive paper P, from the cohesive paper roll 14 is received by/into a paper feed/feeder/feed mechanism (collectively, feed) 18 which directs the cohesive paper P into the housing 12 and to a paper guide 19. The paper guide 19 includes first and second feed rollers R1, R2 disposed opposite one another such that the cohesive paper P is properly received and aligned for curling and cutting. The first and second rollers R1, R2 lead the cohesive paper P over a third roller R3 such that the cohesive paper P is received onto a shaft 20. A rotation mechanism 21, here shown as a first motive roller 22 and a second motive roller 23 connected by a belt or belt drive 25, rotates the shaft 20 and cohesive paper to provide wound cohesive paper 24 about the shaft 20.

Figure 2:
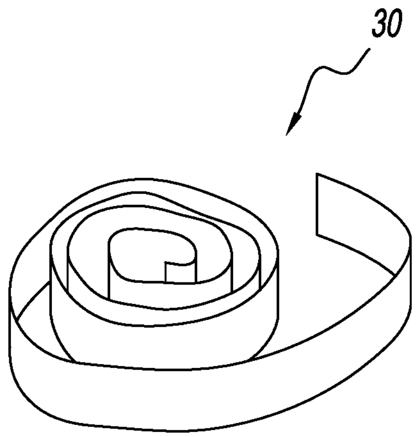
FIG. 2 is a view of an individual packing curl that can be made by the machine of FIG. 1 and a method of manufacture as described herein.
Figure 3:
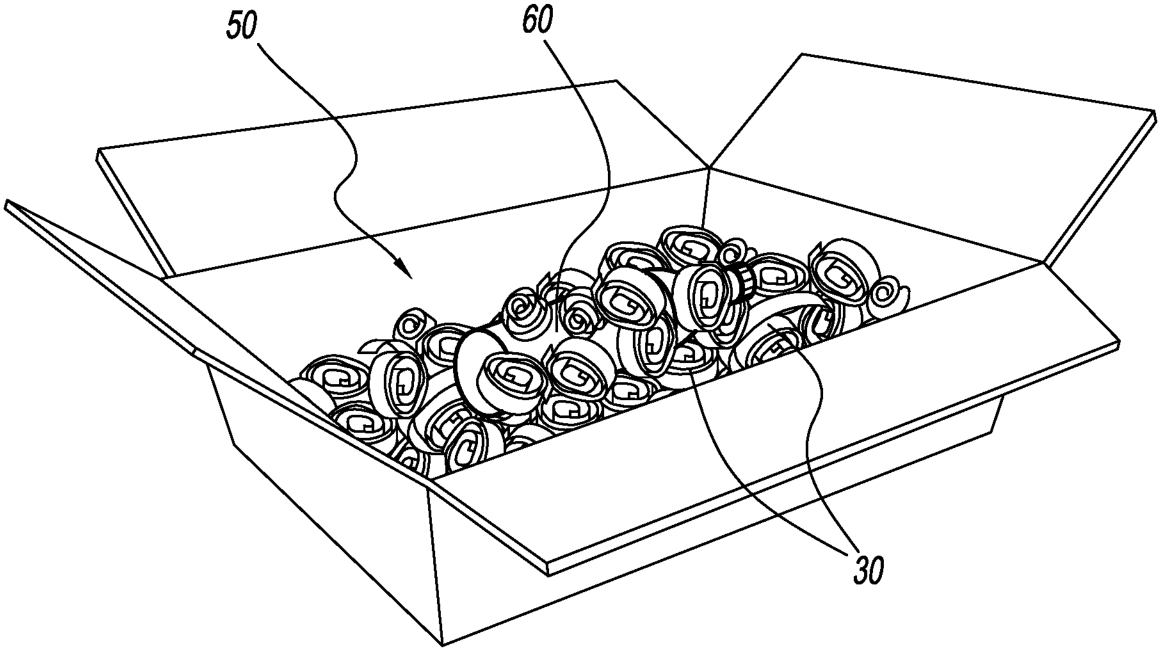
FIG. 3 is a view of a packaged item surrounded by a mass (plurality) of packing curls (curls) made by the exemplary machine of FIG. 1, the mass of packing curls creating a void filler that cushions and protects the packaged item.

The wound cohesive paper 24 travels about the shaft 20 where it encounters a cutter 26, here shown as two cutting blades C1 and C2, that cuts the wound cohesive paper 24 into cohesive paper packing curls (curls) 30, one of which is shown in FIG. 2. Preferably, but not necessarily, each curl has a width of one quarter inch (¼") to three quarters inch (¾") with one half inch (½") being most preferable, and a length of two inches (2") to six inches (6") long. The curls 30 are released into a director 28 which dispenses the curls 30 into a hopper (not shown) or directly into a box as shown in FIG. 3 which contains an item 60. FIG. 3 shows a mass 50 of curls 30 about and/or around the item 60 for product/item packing, cushioning, blocking, bracing, and/or void fill.

While the machine 10 cuts the wound cohesive paper 24 into curls 30 after winding on the shaft 24, it should be appreciated that a machine may produce the present curls by first cutting the cohesive paper into the desired size (width and length) of strips before curling. Moreover, the roll of cohesive paper may already have a width of one quarter inch (¼") to three quarters inch (¾"), which is then cut to a length of two inches (2") to six inches (6") long for curling.

Variations in the curl producing machine 10 are contemplated such as, but not limited to, placement and numbers of cohesive paper guide/feed rollers, the manner of rotating the curling shaft, the manner of feeding the cohesive paper into the curling and cutting mechanisms, and the like. Other variations are contemplated, the end result of which is to make/produce curls 30.

Figure 4:
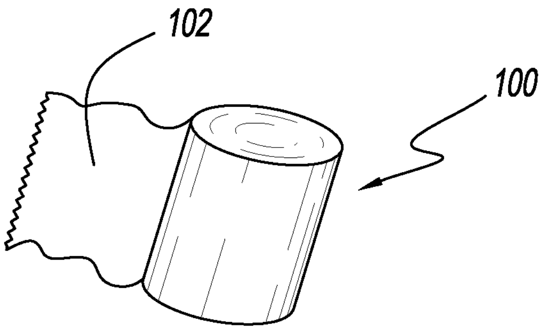
FIG. 4 is a view of a roll of cohesive paper used for the present packing curls.
Figure 5:
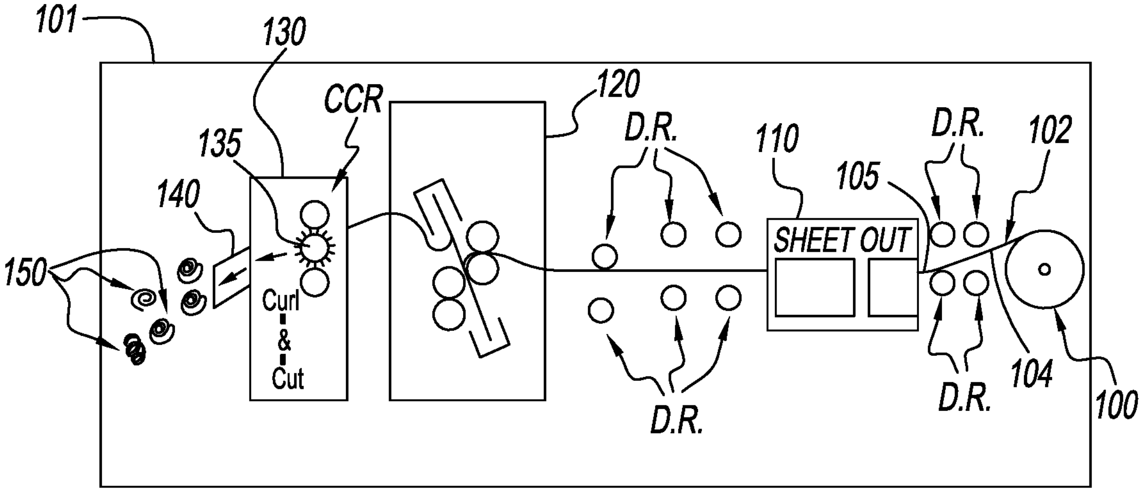
FIG. 5 is a schematic view of another exemplary machine for producing packing curls (curls) from a supply of cohesive paper in accordance with the principles of the present invention.

Referring now to FIG. 4, there is depicted an illustrative roll of cohesive paper 100 such as can be used in the curl producing machine 10 of FIG. 1 and the exemplary curl producing machine 101 of FIG. 5 that produces curls 150 from cut and end-folded strips 200 (see, e.g., FIG. 6) of cohesive paper. The roll of cohesive paper 100 is formed by a wound continuous sheet 102 of cohesive paper of a given width. The machine 101 can accommodate rolls of various widths. As shown in FIG. 5, the sheet of cohesive paper 102 has a cohesive side 104 and a non-cohesive side 105. The exemplary curl producing machine 101 feeds the sheet of cohesive paper 102 through various drive rollers (D.R.) to a cutter or cutting section 110 (labeled Sheet Cut in FIG. 5). The cutting section 110 cuts the sheet of cohesive paper 102 into individual sheets of a given length, the given length of which will be (is) the total length of a curl 150. The cutting section 110 is configured to adjust length size of each individual sheet. Same length individual sheets may be produced in succession or variations in individual sheet length.

Figure 6:
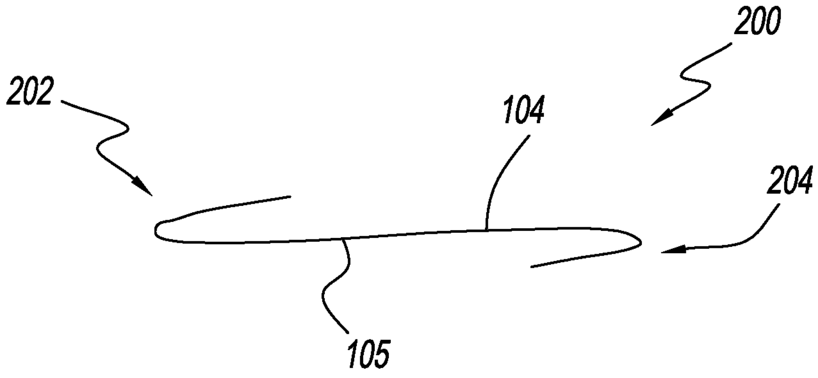
FIG. 6 is a side view of an exemplary cut and folded strip of cohesive paper ready for curling.

The individual length-cut sheets are conveyed to a folder or folding section 120 via drive rollers (D.R.). The folding section 120 is designed to create a folded leading end or edge 202 and a folded trailing end or edge 204 opposite to the folded leading end 202 to each individual length-cut sheet of cohesive paper 200 (see, e.g., FIG. 6). The leading end 202 is folded back onto itself such that the cohesive side 104 of the folded leading end 202 contacts and adheres to the cohesive side 104 of the sheet of cohesive paper 200, while the trailing end 204 is folded back onto itself such that the non-cohesive side 105 of the folded trailing end 204 contacts to the non-cohesive side 105 of the sheet of cohesive paper 200. An individual end folded length of cohesive sheet 200 is depicted in FIG. 6. At this point, the sheet 200 is ready to be cut and curled 135, although not necessarily in that order, with formed curls 150 ejected therefrom via a dispenser 140. Cutting and curling can also be performed simultaneously such as with a cutting/curling roller 320 of FIG. 11.

Figure 7A:
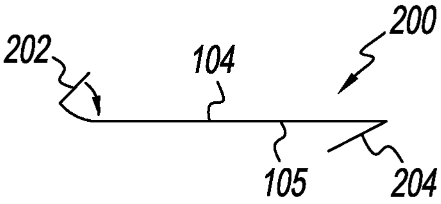
FIGS. 7A-E depict a sequence of curling of the exemplary cut and folded strip of cohesive paper of FIG. 6 into a packing curl in accordance with the principles of the present invention.
Figure 7B:
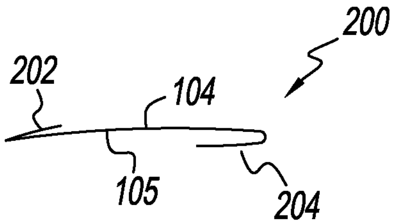
Figure 7C:
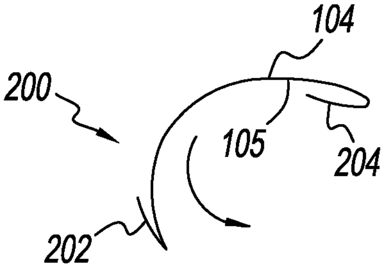
Figure 7D:
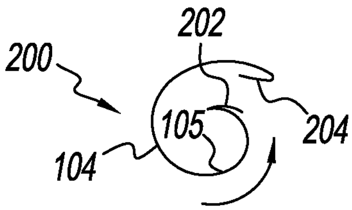
Figure 7E:
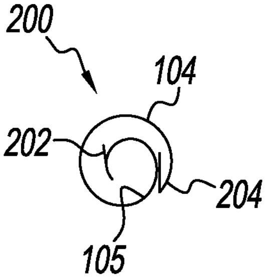
Figure 8:
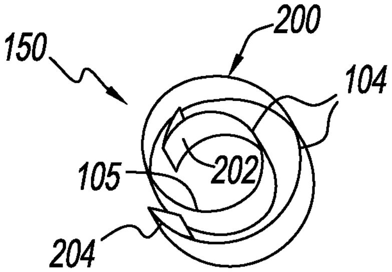
FIG. 8 is a perspective view of a packing curl produced by the principles of the present invention.

In FIGS. 7A-7E, the formation of a curl 150 is illustrated. It should be appreciated that this illustration does not show the mechanism (e.g. rollers, cutters, etc.) for curling, but rather illustrates the manner in which the sheet of cohesive paper 200 is curled. In FIG. 7A the individual sheet of cohesive paper 200 is shown before its ends/edges have been folded. In FIG. 7B, the leading end/edge 202 has been folded such that its cohesive side adheres to the cohesive side 104 of the sheet of cohesive paper 200, while the trailing end/edge 204 of the sheet of cohesive paper 200 has been folded such that its non-cohesive side abuts the non-cohesive side 105 of the sheet of cohesive paper 200. In FIG. 7C, the end-folded sheet of cohesive paper 200 is beginning to be coiled, wound, spiraled, twisted, curled, or the like into a curl 150. The leading end 202 is being curled under itself such that the cohesive side 104 faces outward (is radially outward with respect to the curl 150) and the non-cohesive side 105 faces inward (is radially inward with respect to the curl 150). FIG. 7D illustrates further curling of the end-folded sheet of cohesive paper 200 from that of FIG. 7C. FIG. 7E illustrates a final or near final curling of the sheet of cohesive paper 200. FIG. 8 depicts a final curl 150 cut in a desired strip width. It should be appreciated that the end-folded strip of cohesive paper 200 may be wound or spiraled opposite, or differently, to that shown in FIGS. 7A-E while achieving the same result of having the cohesive side of the curls 150 facing outward.

Figure 9:
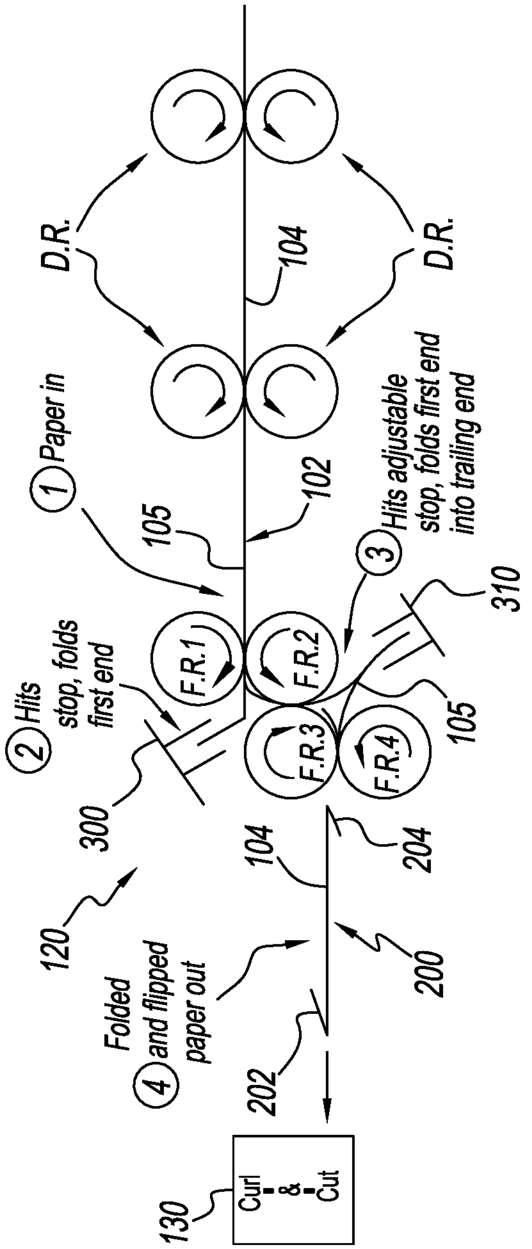
FIG. 9 is a diagrammatic view of the exemplary folding section of the exemplary machine of FIG. 5.
Figure 10:
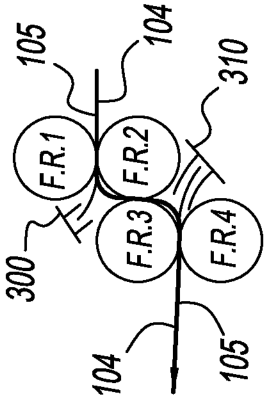
FIG. 10 is an enlarged view illustrating the flow of cohesive paper through the exemplary folding section of FIG. 9.

FIGS. 9 and 10 provide a more detailed depiction of a manner in which the length-cut sheets of cohesive paper gets folded. Drive rollers direct or feed the length-cut sheets of cohesive paper into the folder. Initially, the nomenclature first and second are arbitrary and interchangeable here and throughout. A first end of the sheet 200 is directed by meshing of folding roller 1 (FR1) and folding roller 2 (FR2) into a first stop 300 which bends the first end onto itself such that the non-cohesive side 105 of the first end is adjacent to the non-cohesive side 105 of the sheet 200. As the first end is folded by the first stop 300, a crease is formed in the sheet 200, the crease of which is then fed/conveyed into meshing folding roller 2 (FR2) and folding roller 3 (FR3). The crease of the sheet 200 then becomes the crease of a folded trailing end 204. The folded trailing end 204 is fed into a second stop 310. The second end of the sheet 200 that is now opposite the trailing end 204 will be folded upon itself by meshing folding roller 3 (FR3) and folding roller 4 (FR4) when the trailing end 204 bottoms out in the second stop 310 to form a folded leading end 202. The leading end is folded such that a cohesive side of the second end contacts and adheres to the cohesive side 104 of the sheet 200. The length of the second stop 310 is adjustable. Direction of sheet travel is depicted in FIG. 10. The cohesive paper is fed into the machine 101 with the cohesive side in one direction, with the folded sheets of cohesive paper flipped for cutting. The end-folded sheet of cohesive paper 200 is then sent to the curler and cutter 130.

Figure 11:
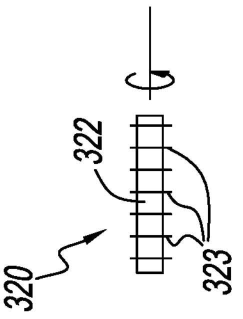
FIG. 11 is a top view of an exemplary roller for curling and cutting the curls.

FIG. 11 depicts an exemplary curling and cutting roller 320 of the curl and cut section 130. A curling and cutting roller 320 is characterized by a cylinder 322 having a plurality of radial blades 323 spaced to provide a given strip width. Different rollers can provide a difference strip width. The curling and cutting section 130 may use more cutting rollers, and/or different manners of curling and cutting the sheets 200. The process of selecting strip width may also be automatic. As the sheets 200 are wound onto the roller 322, the blades 323 cut the width. Other manners may be used.

Figure 12:
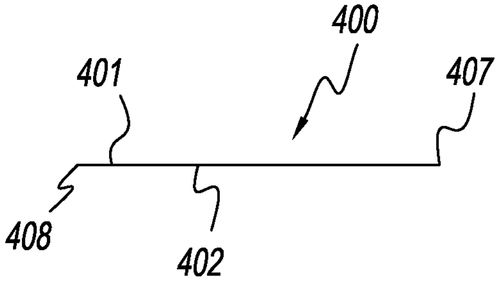
FIG. 12 is a side view of a strip of cohesive paper that will be formed into a packing product fashioned as a "B" in accordance with the principles of the present invention.

In FIG. 12 there is shown a strip of cohesive paper 400, from the various types of paper that can be used for/in the present invention (see Summary of the Invention), to form a packing material in the form of a "B" (see, e.g., FIGS. 13 and 14) or a modified "B" (see e.g., FIG. 13A) in accordance with the present principles. While cohesive paper is preferred, non-cohesive paper, coated paper, non-coated paper, a paper blend, or others may be used. The strip of cohesive paper 400 has a selectable width, a selectable length, a cohesive side 401, a non-cohesive side 402, a first end 407, and a second end 408, the nomenclature first and second being arbitrary. The first end 407 may be considered a leading end, while the second end 408 may be considered a trailing end. The width of the strip of cohesive paper 400 is determined by the particular cutter 426 used in the packing product production machine 413 (see FIGS. 16-18), set automatically or electronically. The dimensions of the cutter 426 fix the width of the strip of cohesive paper 400. Different cutters are used to change the width of the strip of cohesive paper 400. For instance, one cutter 426 of the packing material production machine 413 may cut the sheet 420 of the roll of cohesive paper 415 into multiple strips of cohesive paper having the same width, while another cutter may cut the sheet 420 of the roll of cohesive paper 415 into multiple strips of cohesive paper 400 each having a different width. A cutter 426 may not be used such that the width of the sheet 420 of the roll of cohesive paper 415 is the width of the strip of cohesive paper 400. A cutter 426 may allow on-the-fly variations in a width or widths of paper strips as controlled by the machine with/without human intervention. Variations are contemplated. The length of the strip of cohesive paper 400 is determined by the principles of the present invention as described below.

Figure 13:
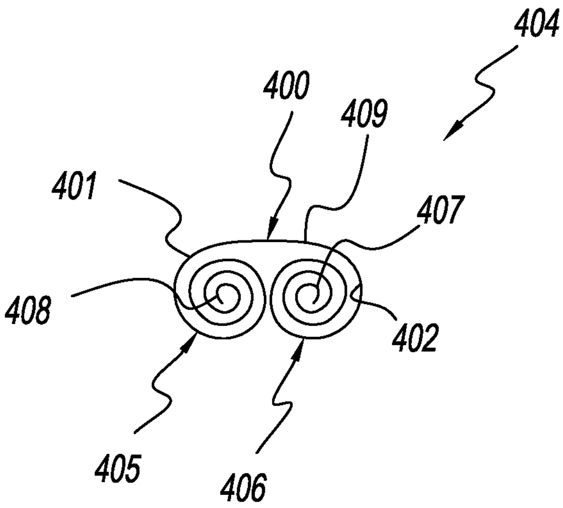
FIG. 13 is a top view of a "B" formed in accordance with the principles of the present invention.
Figure 14:
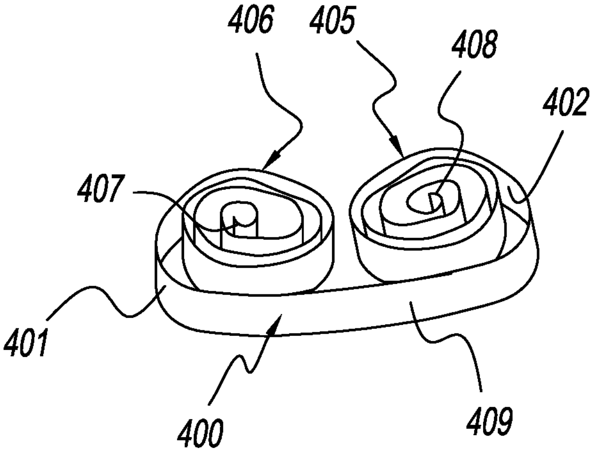
FIG. 14 is a perspective view of the "B" of FIG. 13.
Figure 15:
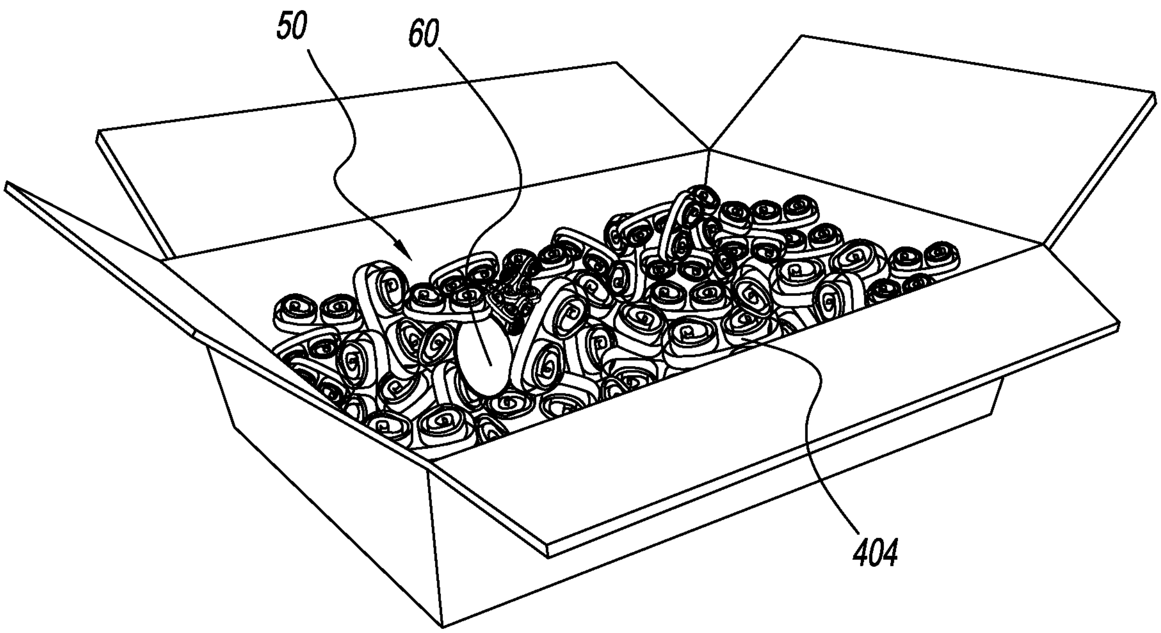
FIG. 15 is a view of a receptacle with an item surrounded by a mass (plurality) of the present packing product ("B"s) made by the exemplary machine of FIGS. 16-18, the mass of packing "B"s creating a void filler that cushions and protects the packed item.

FIGS. 13 and 14 depict a "B" 404 formed or produced by the exemplary packing product production machine 413. Machines of other designs may be used to create the packing material ("B"s) shown and described herein with the same or other methods of production. FIG. 13 provides a side view of the "B" 404 while FIG. 14 provides a perspective view of the "B" 404. The "B" 404 is formed by the strip of cohesive paper 400 such that the cohesive side 401, preferably, but not necessarily, faces radially outward, while the non-cohesive side 402 is preferably, but not necessarily, facing radially inward. If non-cohesive paper is used, the outward and inward faces (401, 402) are both non-cohesive. The "B" 404 has a first curl, spiral, coil, twist, whorl or the like 406 formed at the first end 407 (arbitrarily, a leading end) of the strip of cohesive paper 400, and a second curl, spiral, coil, twist, whorl or the like 405 formed at the second end 408 (arbitrarily, a trailing end) of the strip of cohesive paper 400, the nomenclature first and second being arbitrary, with a connecting portion 409. The first curl 406 is wound in a first direction, while the second curl 405 is wound in a second direction opposite that of the first direction. Thus, one direction is clockwise while the other direction is counter-clockwise. The first curl 406 has a first diameter while the second curl 405 has a second diameter, the first and second diameters may be the same or different as required, necessary, or desired. The tightness of the winding of the curl effects the diameter, as well as the length of paper used to produce the curl. Preferably, but not necessarily, the amount or length of spiral of each curl is sufficient to provide a spiral that will hold its shape after forming. FIG. 15 shows a mass 50 of "B"s 404 in a receptacle about and/or around the item 60 for, without limitation, product/item packing, cushioning, blocking, bracing, and/or void fill.

Figure 13A:
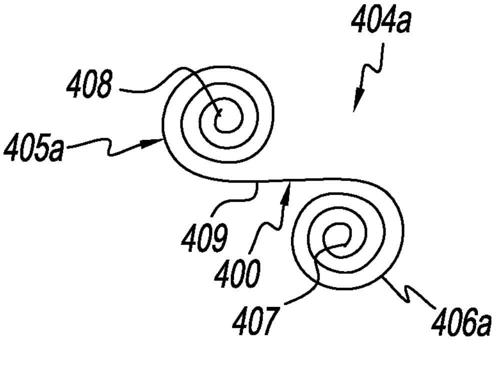
FIG. 13A is a top view of a modified "B" formed in accordance with the principles of the present invention.

FIG. 13A provides a variation of the present packing product generally designated 404*a* having the same or similar components/characteristics/features to the packing product 404 of FIG. 13. As such, those components/characteristics/features that are the same have the same callout number, while those components/characteristics/features that are similar include the designation "a". The packing product 404*a* may be formed with or without cohesive paper like "B" 404. The strip of paper 400 has a leading (first) end 407 and a trailing (second) end 408, the nomenclature first and second being arbitrary here and throughout, unless indicated to the contrary, and the assignment of leading and trailing being arbitrary here and with respect to the "B" 404. A first curl 406*a* of a first rotational direction and of a first diameter is provided at the first/leading end 407 of the strip of paper 400, while a second curl 405*a* of the first rotational direction and of a second diameter is provided at the second/trailing end 408. The first and second diameters may be the same. Since the rotational direction of the first and second curls 406*a*, 408*a* are the same, a modified "B" (packing product) 404*a* is created.

Figure 16:
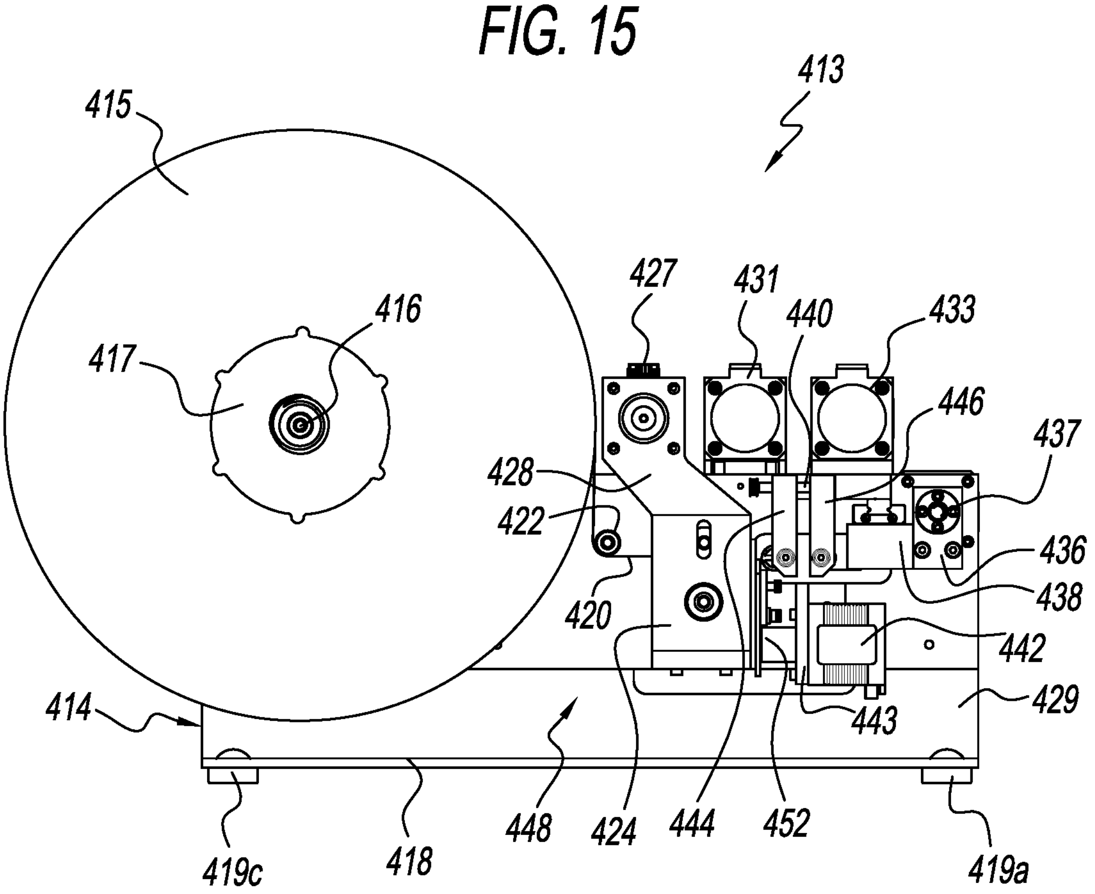
FIG. 16 is a side view of an exemplary machine for producing the present "B"s.
Figure 17:
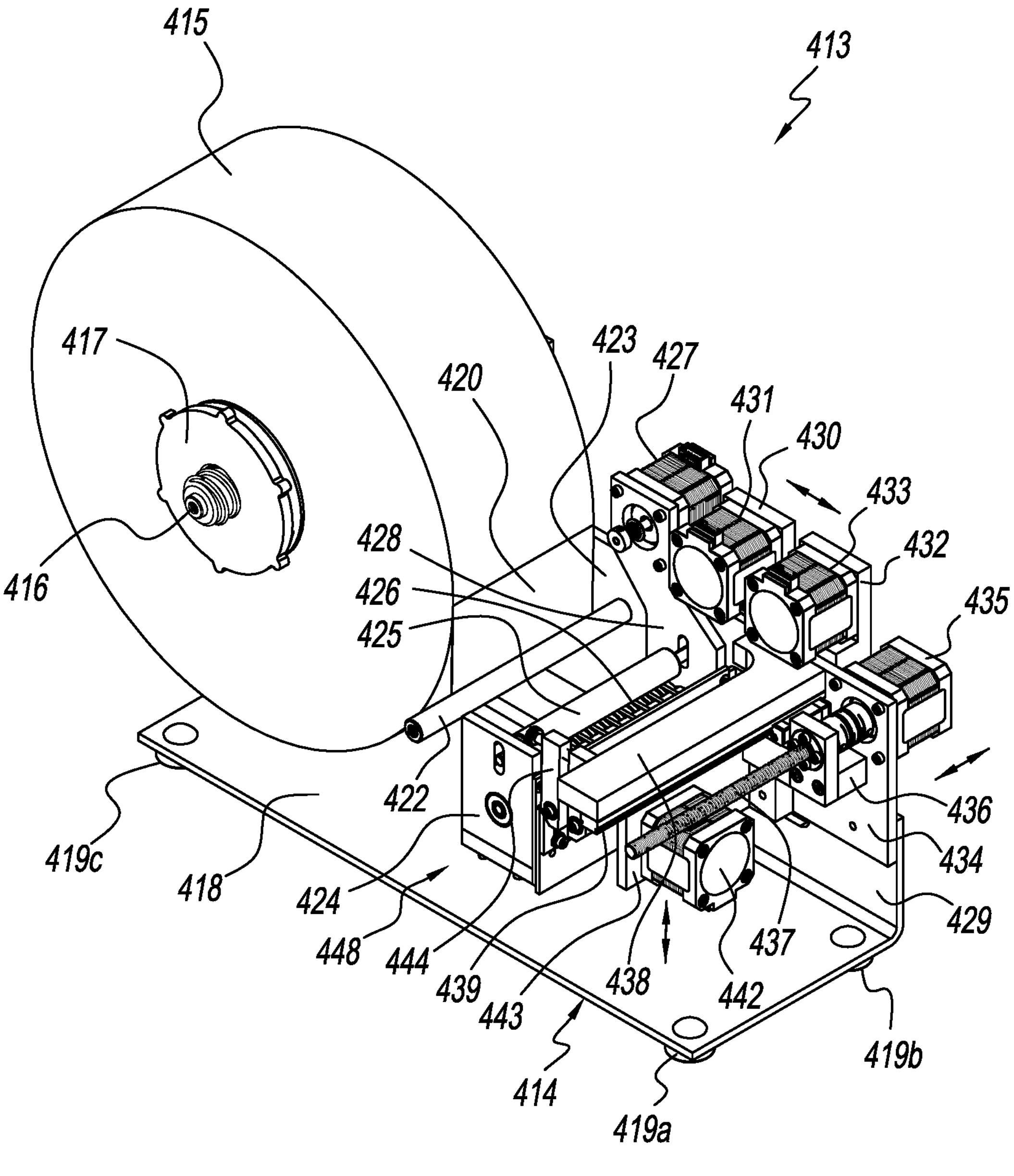
FIG. 17 is a top side view of the exemplary machine for producing the present "B"s of FIG. 16.
Figure 18:
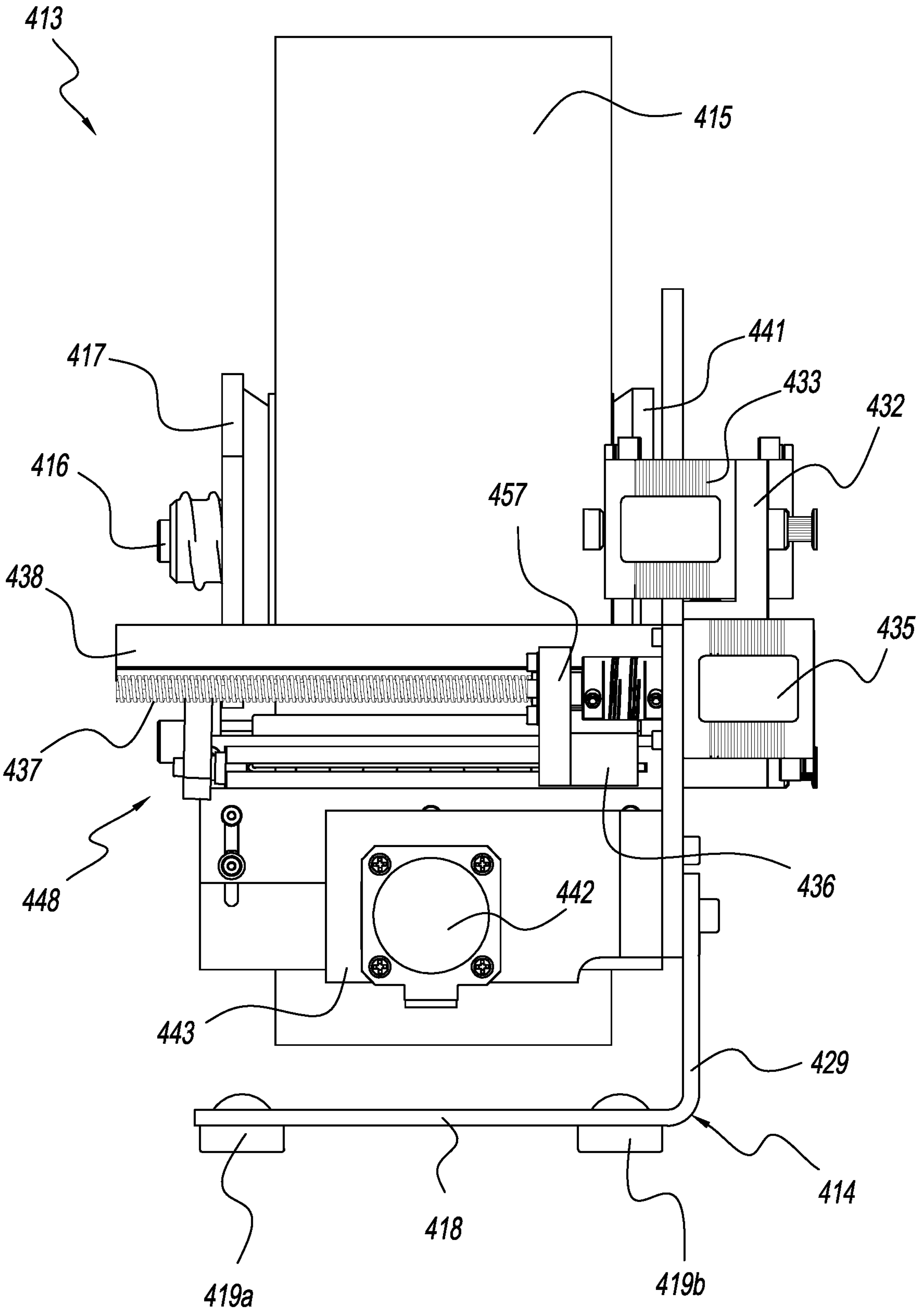
FIG. 18 is an end view of the exemplary machine for producing the present "B"s of FIG. 16.
Figure 19:
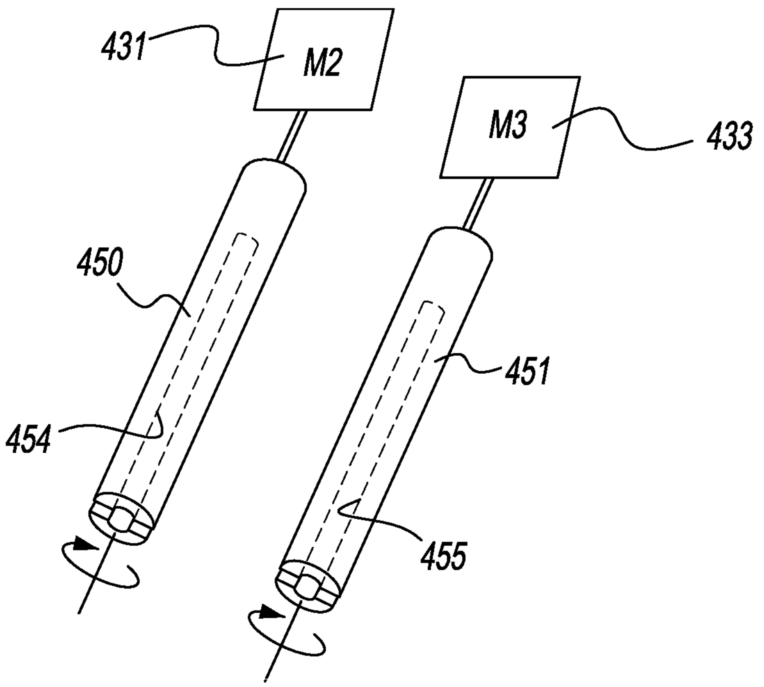
FIG. 19 is a view of the paper curling rods of the exemplary machine for producing the present "B"s of FIG. 16.

Referring to FIGS. 16-18, there is shown the exemplary packing product production/forming machine 413. The packing product production machine 413 has a frame 414 having a base or bottom 418 supported by a plurality (here, four) of feet, pads or the like 419*a*, 419*b*, 419*c*, and 419*d* preferably, but not necessarily, at or proximate to the four corners of the base 418. More or less feet may be used. The packing product production machine 413 may also be assembled onto other types of mounting, as well as its components. It should also be appreciated that the components of the packing product production machine 413 and/or the manner of effecting production of "B"s may be different than that shown. The frame 414 also has an upturned portion 429 at a longitudinal side of the base 418 that supports a mounting plate 434.

The packing product production machine 413 is configured to hold a roll of cohesive (non-cohesive, coated, or otherwise) paper 415 for making the present packing material. The roll of paper 415 is held on a rotatable shaft 416 and rotationally supported by a first retention spindle 417 on a first side of the roll of paper 415, and a second retention spindle 441 on a second side of the roll of paper 415, the nomenclature first and second being arbitrary. The first and second retention spindles 417, 441 hold the roll of paper 415 onto the shaft 415 such that the roll of paper 415 can rotate with the shaft 416. The roll of paper 415 has a continuous sheet of paper 420 that is fed into the various components/mechanisms of the packing material production machine 413 that will cut and dimension the sheet of paper 420 into a strip 400, form one or more "B"s from the strip 400, and eject the one or more formed "B"s from the packing product forming machine 413, as described in more detail below.

Figure 27:
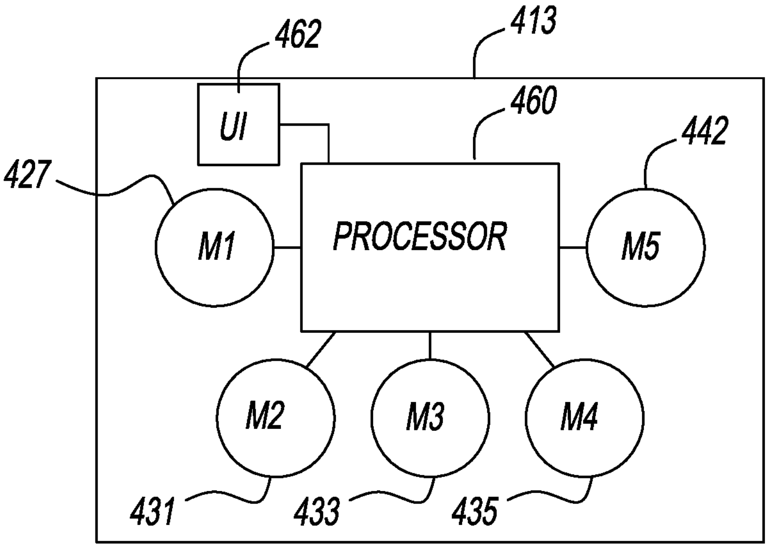
FIG. 27 is a block diagram of a control portion of the exemplary machine for producing the present "B"s of FIG. 16.

The sheet of paper 420 is fed into a packing product forming portion or section 448. The sheet of paper 420 extends under a guide roller 422, under a rotating cutting roller 425, then over the cutter 426. As explained above, the cutter 426 dimensions the sheet of paper 420 into strips 400 of paper of widths according to the cutter 426. The cutting roller 425 is rotated by a cutting roller motor 427 that is supported on a frame portion 428 that is attached to a brace 423 that extends from the upturned portion 429. The cutting roller motor 427 is coupled to the cutting roller 425 for rotating the cutting roller 425 and feeding the sheet of paper 420 over the cutter 420 in order to cut the sheet of paper 420 into the strips of paper 400. The leading end 407 of the width-dimensioned strip(s) of paper 400 is then fed into and through a first curling rod or spindle 450, then further fed into and through a second curling rod or spindle 451, the nomenclature first and second being arbitrary. The first curling rod 450 is coupled to a first curling rod motor 431 that is supported on a first frame portion 431 that extends from the mounting plate 434 for rotating the first curling rod 450, while the second curling rod 451 is coupled to a second curling rod motor 433 that is supported on a second frame portion 432 that extends from the mounting plate 434 for rotating the second curling rod 450, the nomenclature first and second being arbitrary. The first curling rod motor 431 provides rotational positioning of the first curling rod 450. Additionally, the first curling rod motor 431 is controllable to rotate the first curling rod 450 a given number of revolutions in order to curl the trailing end 408 of the width-dimensioned strip(s) of paper 400 as described herein. The given number of revolutions may be controlled to provide the second curl 405 of the "B" 404 with the given number of spirals as desired for a particular packing application or otherwise, and/or a particular diameter. The diameter may depend on the tightness of the spiral and the length of the second curl 405. The second curling rod motor 433 provides rotational positioning of the second curling rod 451. Additionally, the second curling rod motor 433 is controllable to rotate the second curling rod 451 a given number of revolutions in order to curl the leading end 407 of the width-dimensioned strip(s) of paper 400 as described herein. The given number of revolutions may be controlled to provide the first curl 406 of the "B" 404 with the given number of spirals as desired for a particular packing application or otherwise and/or a particular diameter. The diameter may depend on the tightness of the spiral and the length of the first curl 406. The given number of spirals of the first curl 406 and the given number of spirals of the second curl 405 may be the same or different, again depending on the particular packing application or otherwise. As represented in FIG. 27, the first curling rod motor 431 (M2) and the second curling rod motor 433 (M3) are in communication with a processor 460 of the packing product forming machine 413. Likewise, the cutting roller motor 427 is controlled through communication with and via the processor 460.

As shown in FIG. 18, the first curling rod 450 has a first longitudinal slot 454 that is open at one end and closed at an opposite end, while the second curling rod 451 has a second longitudinal slot 455 that is open at one end and closed at an opposite end, the nomenclature first and second being arbitrary. The leading end of the sheet of width-dimensioned sheet of paper is fed into the first longitudinal slot 454 of the first curling rod 450, then through the second longitudinal slot 455 of the second curling rod 451. The first and second curling rods 450, 451 are positioned by their respective motors 431, 433 via the processor 460 such that the longitudinal slots are aligned to allow the sheet of width-dimensioned sheet of paper to be fed through the longitudinal slots.

The packing product production machine 413 further has a sheet cutting motor 442 that is in communication with the processor 460 and labeled M5 in FIG. 27. The processor 460 controls the sheet cutting motor 442. The sheet cutting motor 442 is mounted on a support 443 and is configured to operate a sheet cutter 452 that cuts the sheet of paper 420 into the strip of paper 400 at the appropriate time. As described herein, the packing product production machine 413 further has an ejection motor 435 that is mounted to a plate 434 situated on the upturned portion 429 and which is in communication the processor 460 and labeled M4 in FIG. 27. The processor controls the ejection motor 435. The ejection motor 435 controls an ejection rod 437 that is connected to a sliding ejection assembly 436. The sliding ejection assembly 436 is movably attached to an underside of a rail 439 of a support plate 438 that extends transverse from the mounting plate 434. As the ejection motor 435 rotates the ejection rod 437, the sliding ejection assembly 436 is caused to move along the rail 439 away from the mounting plate 434. The sliding ejection assembly 436 includes an ejection plate 457 that moves with the ejection assembly 436. The ejection plate 457 extends essentially parallel to the mounting plate 434 and is configured to push or eject formed "B"s from the first and second curling rods 450, 451.

Figure 21:
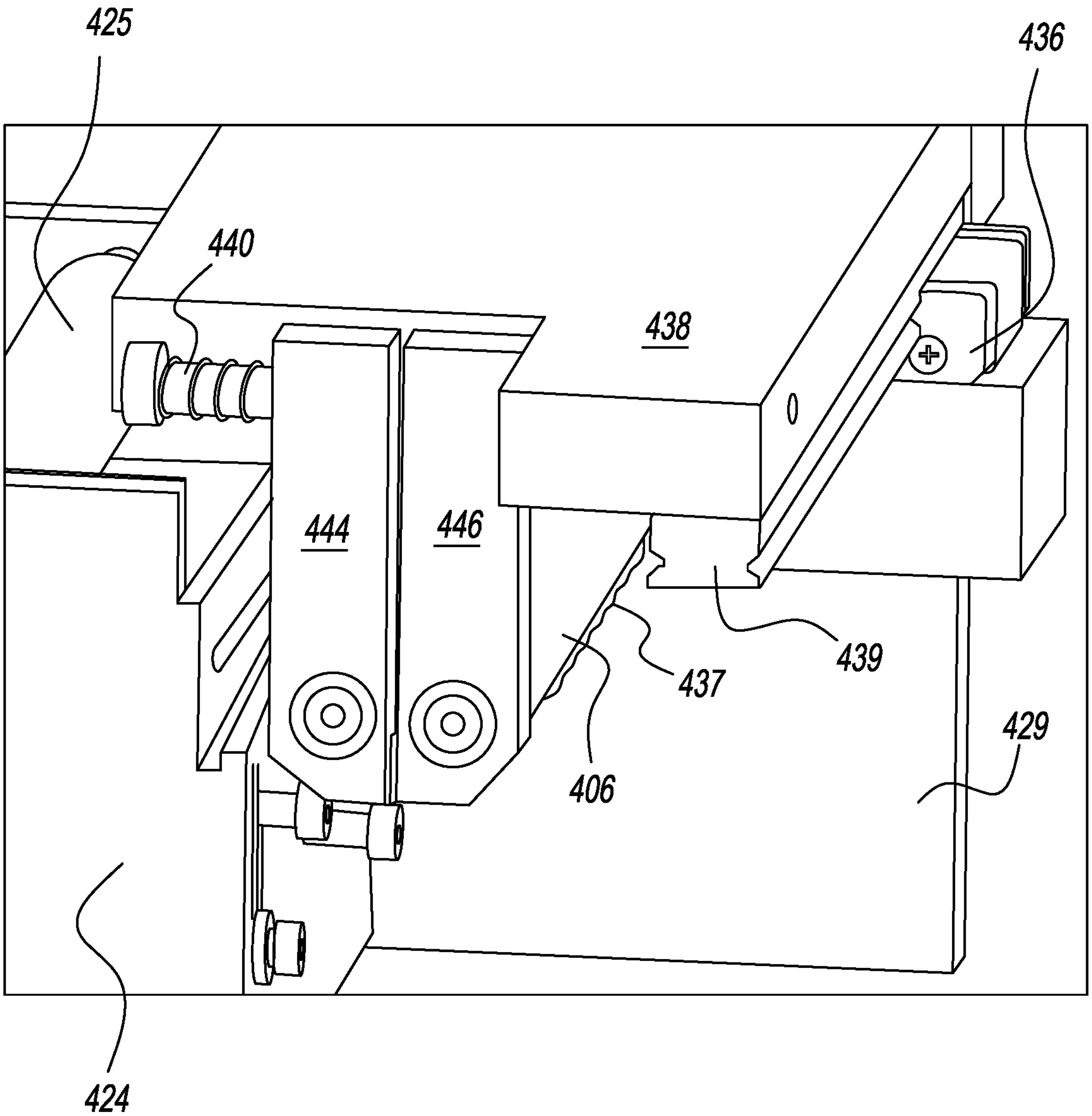
FIG. 21 is a partial view of the exemplary machine for producing the present "B"s of FIG. 16 showing the strip of cohesive paper being further formed into a "B" relative to FIG. 20.
Figure 22:
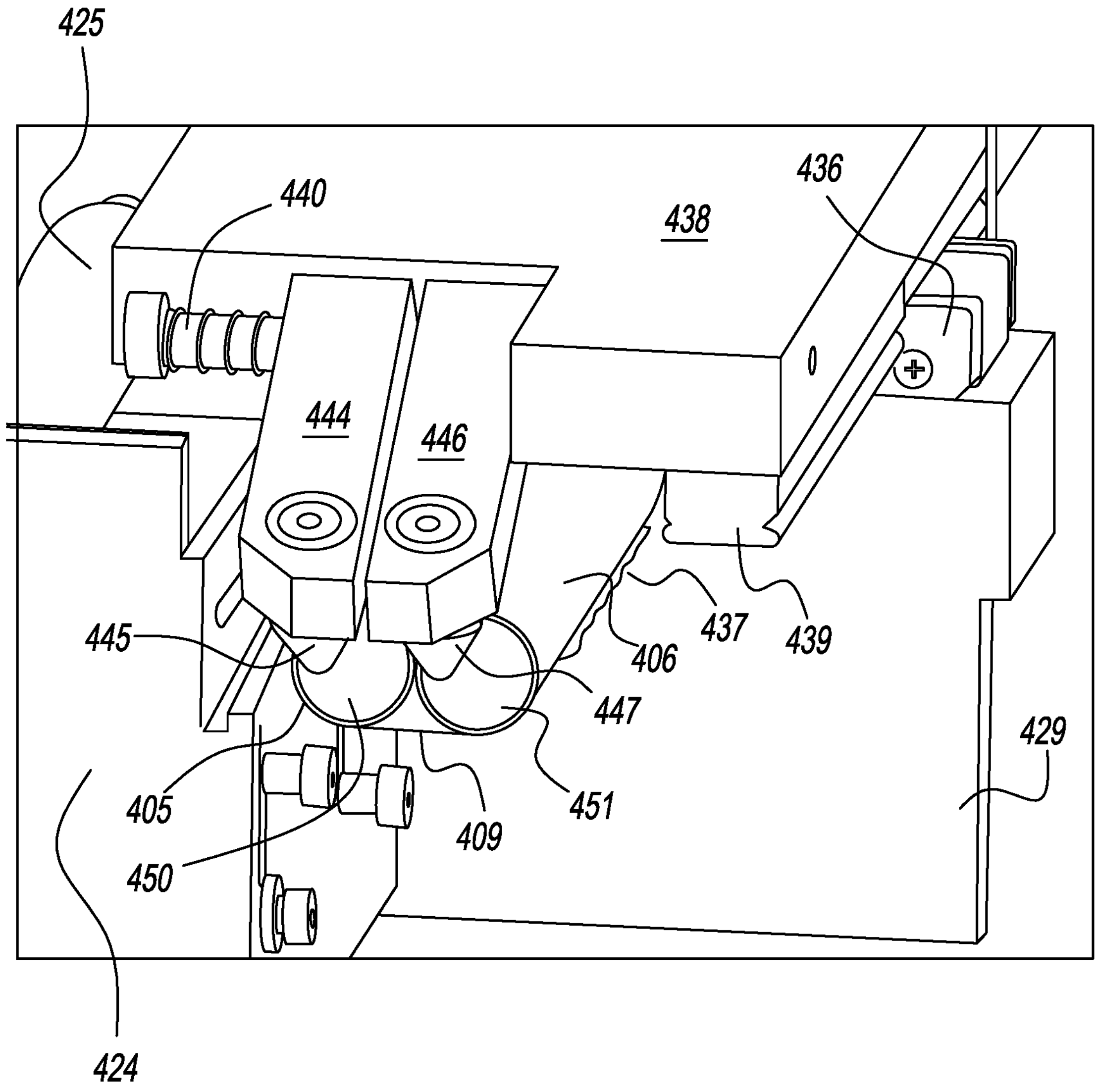
FIG. 22 is a partial view of the exemplary machine for producing the present "B"s of FIG. 16 showing the formed "B" beginning to be ejected from the exemplary machine for producing the present "B"s of FIG. 16, the paper curling rods end holders beginning to pivot for ejection of the formed "B"
Figure 23:
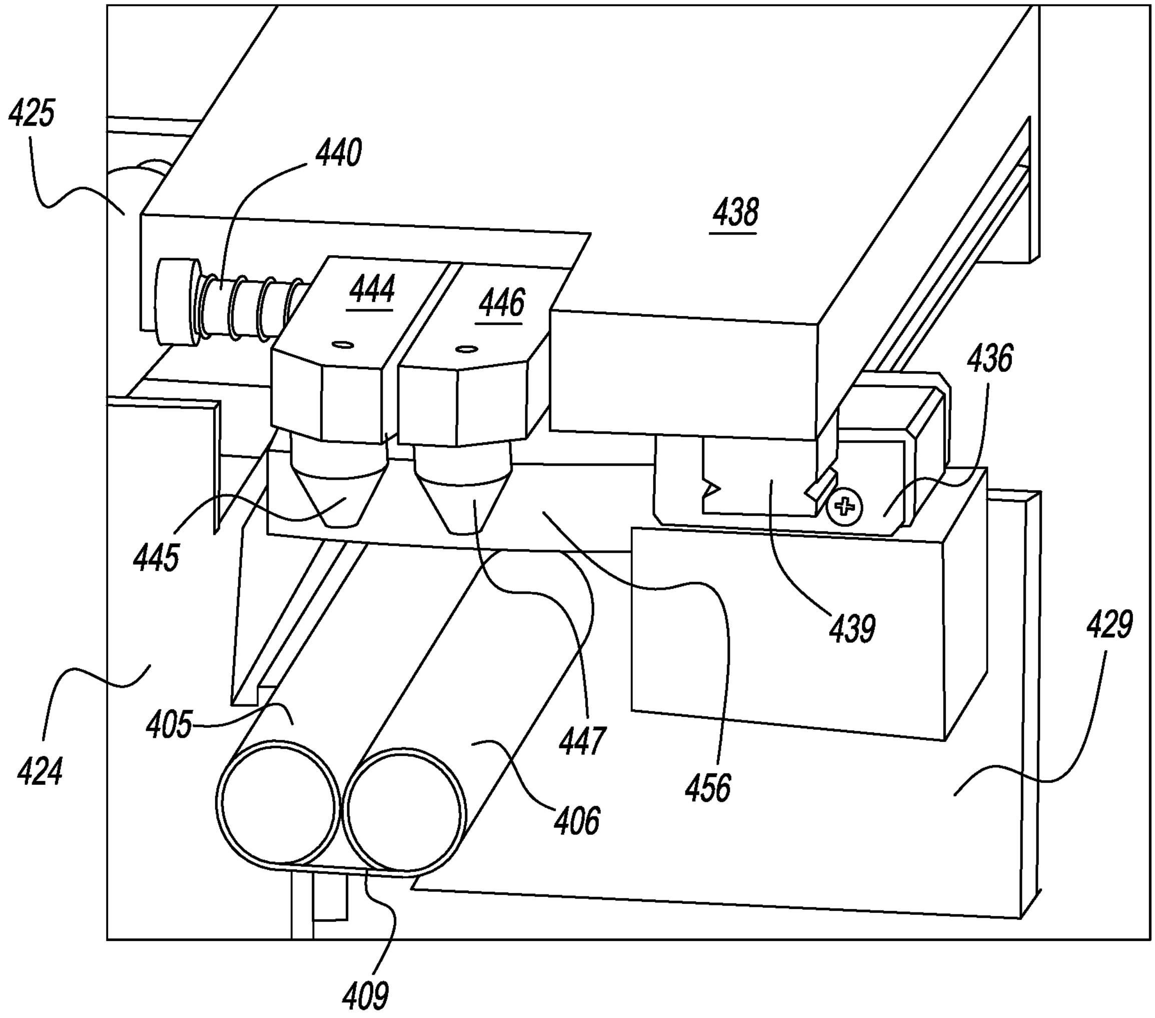
FIG. 23 is a partial view of the exemplary machine for producing the present "B"s of FIG. 16 showing the formed "B" being further ejected from the exemplary machine for producing the present "B"s of FIG. 16 relative to FIG. 22, the paper curling rod end holders fully pivoted for ejection of the formed "B"

As best seen in FIG. 16, the packing product production machine 413 has a bar 440 that retains a first pivoting retention arm 444, and a second pivoting retention arm 446, the nomenclature first and second being arbitrary, here and below. As seen in FIGS. 21-23, for example, the first pivoting retention arm 444 has a first conical projection 445 at a bottom of the first pivoting retention arm 444 that extends transverse to the first pivoting retention arm 444. The first conical projection 445 is configured to hold an end of the first curling rod 450 during formation of "B"s. Again as seen in FIGS. 21-23, for example, the second pivoting retention arm 446 has a second conical projection 447 at a bottom of the second pivoting retention arm 446 that extends transverse to the second pivoting retention arm 446. The second conical projection 447 is configured to hold an end of the second curling rod 451 during formation of "B"s. The first curling rod 450 along with the first pivoting retention arm 446 is configured to move along the bar 440 as explained below during formation of "B"s.

As depicted in FIG. 27, the packing product production machine 413 has a processor 460 for controlling operation of the various components thereof. The processor 460 may include memory for storing programming, as well as other components to provide the functions and/or functionality of the packing material production machine 413 necessary for operation thereof. The processor 460 may be any type of processor. The processor 460 is in communication with the cutting roller motor 427 (M1), the first curling rod motor 431 (M2), the second curling rod motor 433 (M3), the ejection motor 435 (M4), and the cutting motor 442 (M5). While not shown, the packing material production machine 413 may include an interface that allows a user to select various parameters for production of a "B". For instance, a user may select a length of the sheet of paper 404 which determines, at least in part, the number of turns or spirals of the first curl 406 and of the second curl 405. The user may also select the number of turns or spirals, tightness, and the like of the first curl 406, and of the second curl 405. The number turns or spirals may be different. Other functions and/or parameters may be modified and/or selected via a user interface UI 462.

The cutter 426 of the packing product production machine 413 may be replaceable in order to create "B"s of various widths. For example, one cutter may provide for a given number of "B"s of the same width. Another cutter may provide for a given number of "B"s of different widths. Rather than switching out cutters, the cutter 426 may allow for automatic change of its cutting blades to set a width or widths of formed "B"s. The interface would thus allow for the user to select the cutting width(s).

Figure 20:
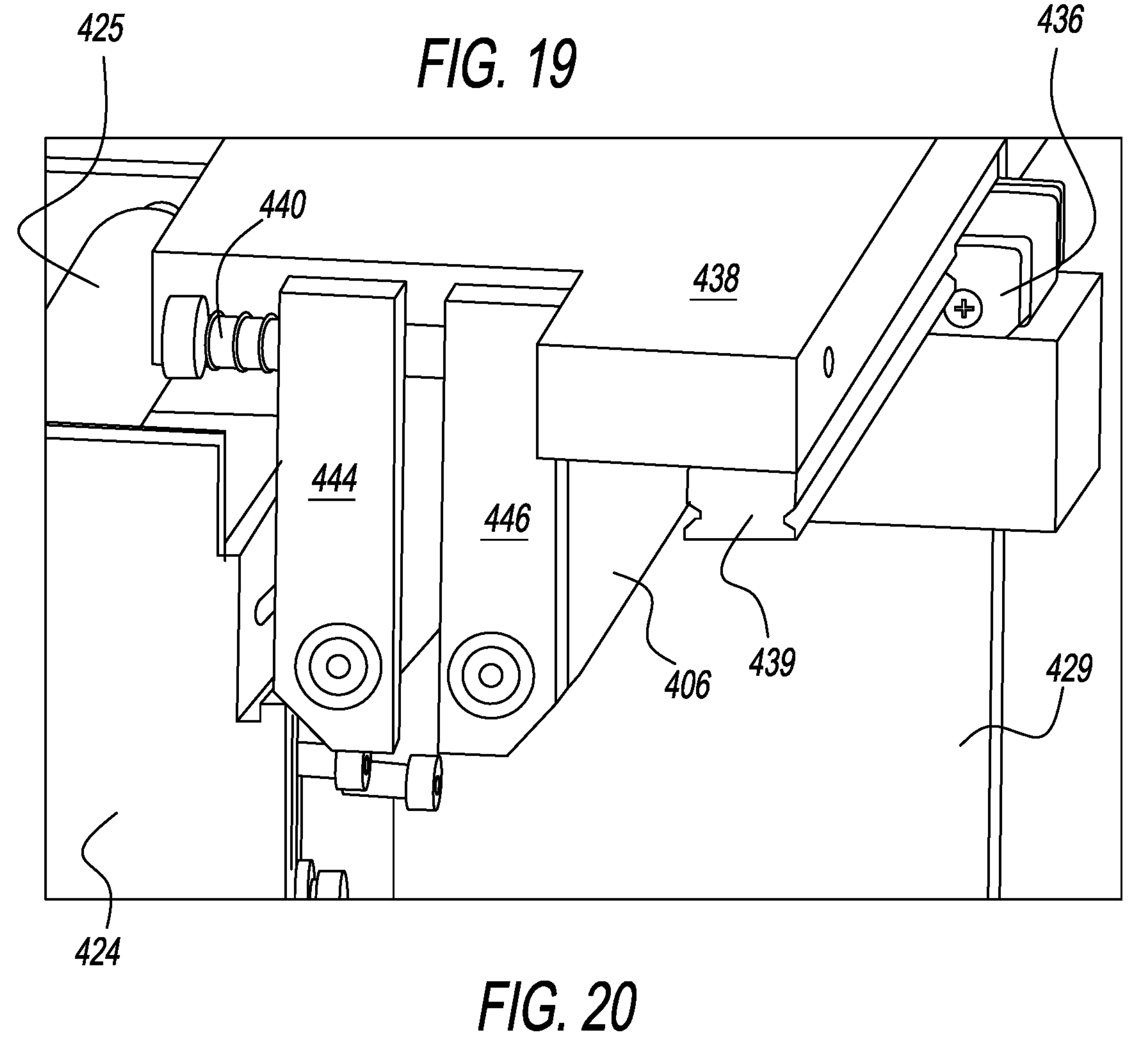
FIG. 20 is a partial view of the exemplary machine for producing the present "B"s of FIG. 16 showing the strip of cohesive paper of FIG. 12 being formed into a "B" in accordance with the principles of the present invention.
Figure 24:
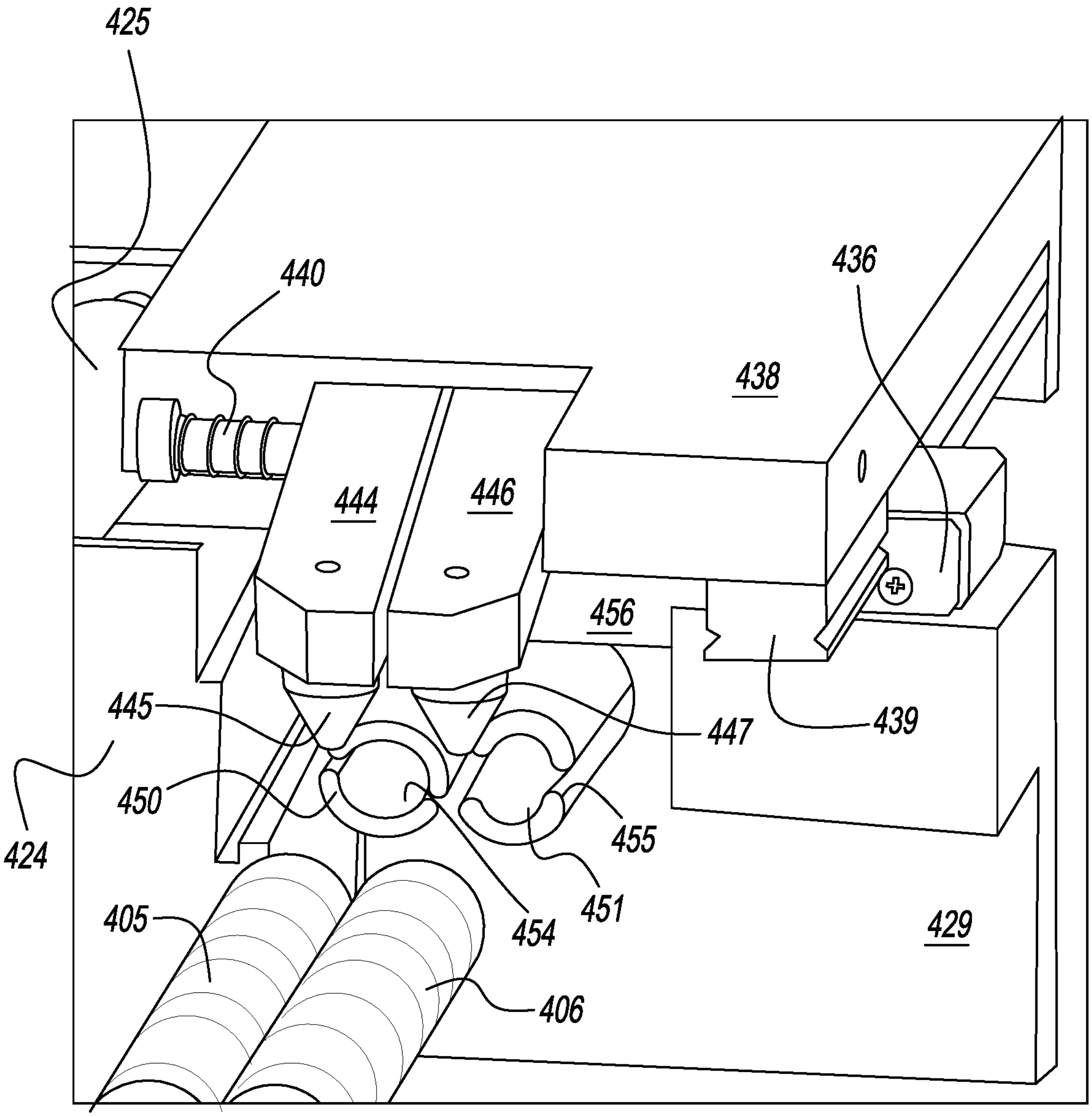
FIG. 24 is a partial view of the exemplary machine for producing the present "B"s of FIG. 16 showing the formed "B" fully ejected from the exemplary machine for producing the present "B"s of FIG. 16.
Figure 25:
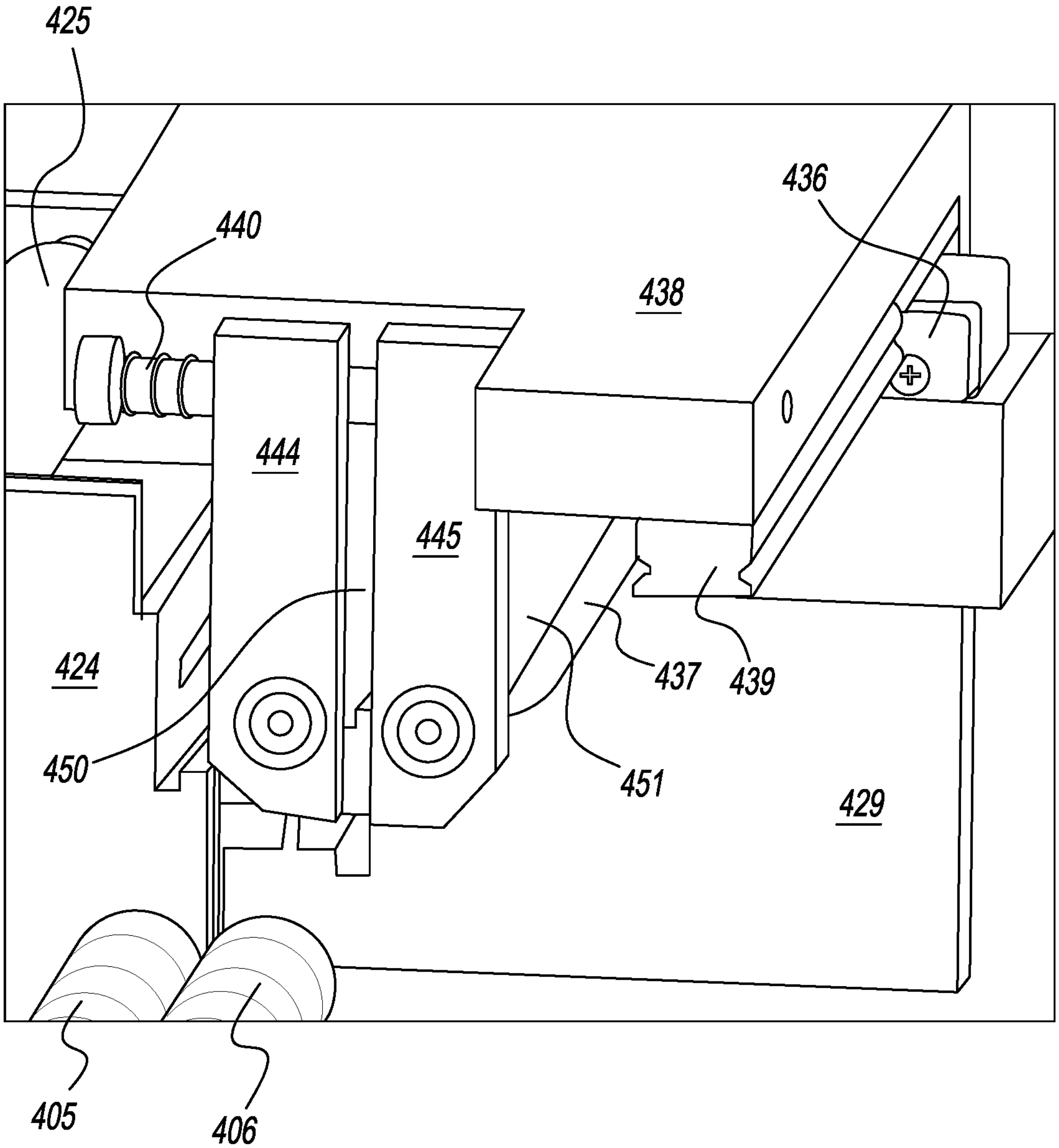
FIG. 25 is a partial view of the exemplary machine for producing the present "B"s of FIG. 16 showing the paper curling rods end holders returned to an initial state.

FIGS. 20-25 depict formation of one or more "B"s via the packing product production machine 413 particularly the action of the first pivoting retention arm 444, the second pivoting retention arm 446, and the sliding ejection assembly 436. In FIG. 20, the first curl 406 of a "B" 404 has been formed around the second curling rod 451 with the second pivoting retention arm 446 and its conical projection 447 holding the end of the second curling rod 451. The second curl 405 of the "B" 404 has been formed around the first curling rod 450 with the first pivoting retention arm 444 and its conical projection 445 holding the end of the first curling rod 450. In FIG. 21, the sheet of paper 420 has been cut into the strip of paper 400 with the "B" 404 being formed. The first curling rod 450 and associated first pivoting retention arm 444 has been translated toward the second curling rod 451 and its associated second pivoting retention arm 446, with the second curl 405 wound more tightly. In FIG. 22, the sliding ejection assembly 436 begins to slide outwardly along the rail 439 of the support bar 438 such that the ejection plate 457 begins to push the formed "B" 404 off the first and second curling rods 451, 450. The first and second pivoting retention arms 444, 446 are caused to pivot outwardly on the screw bar 440 via rotation of the screw bar 440. In FIG. 23, as the screw bar 440 is further rotated to pivot the first and second pivoting retention arms 444, 446 fully out and upward, the ejection plate 456 is caused to further slide push the formed "B" 404 from the first and second curling rods 451, 450. In FIG. 24, the fully formed "B" 404 has been fully ejected from the first and second curling rods 451, 450 and from the packing product production machine 413. In FIG. 25, the screw bar 440 has been rotated reverse to the previous rotation that pivoted the first and second pivoting retention arms 444, 446 to pivot the first pivoting retention arm 444 and its conical projection 446 back to holding the first curling rod 450, and the second pivoting retention arm 446 and its associated conical projection 447 back to holding the second curling rod 451. The packing product production machine 413.

Figure 26A:
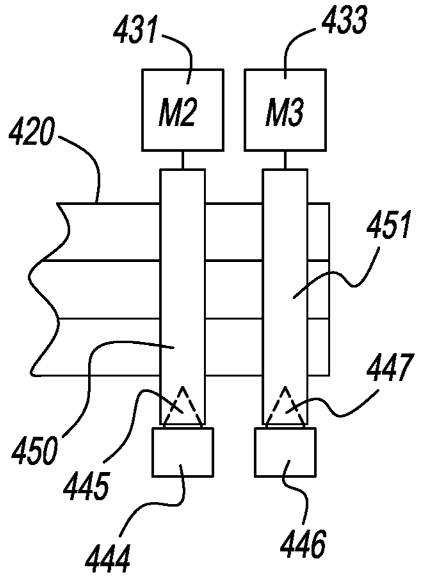
FIGS. 26A-F are representative views of the process of creating "B"s by the exemplary machine for producing the present "B"s of FIG. 16 in accordance with the principles of the present invention.
Figure 26B:
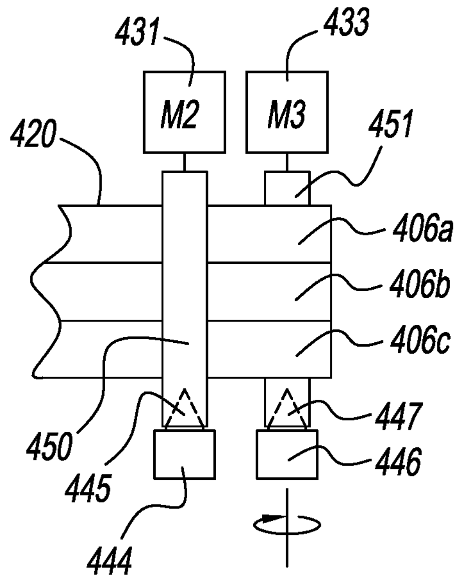
Figure 26C:
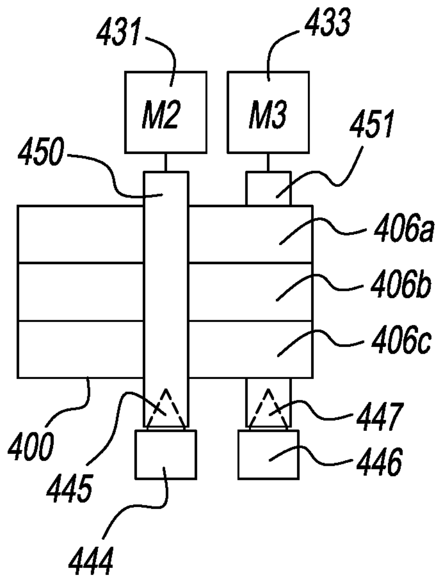
Figure 26D:
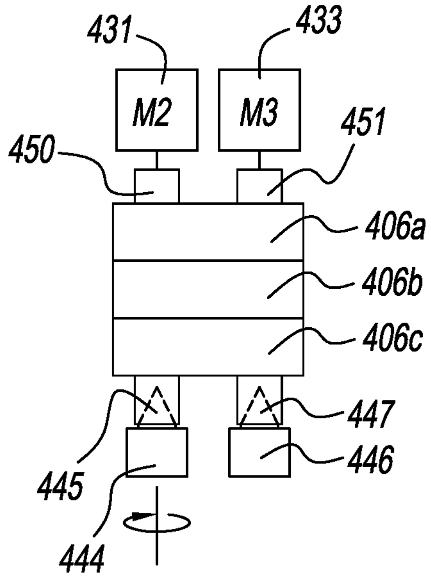
Figure 26E:
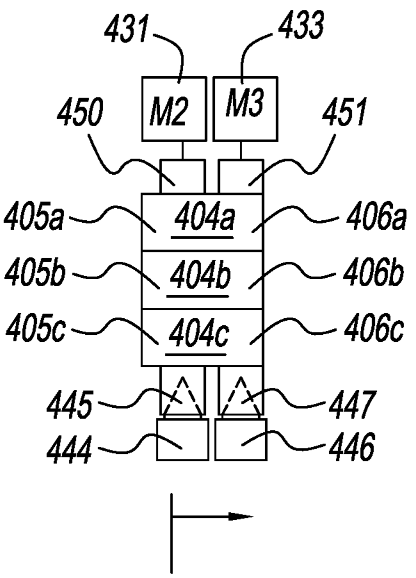
Figure 26F:
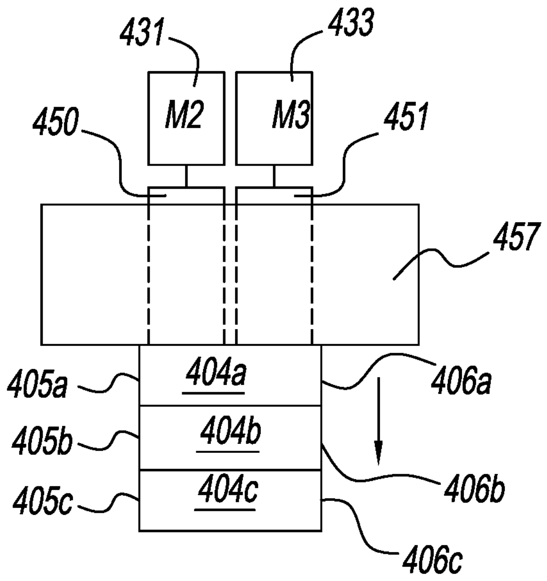

FIGS. 26A-F depicts a representation of the creation of multiple "B"s 404*a*, 404*b* and 404*c* being formed by the present packing material production machine 413. While multiple "B"s are shown being formed, the same principles and procedure applies to the formation of a single "B" 404. FIG. 26A depicts the sheet of cohesive paper 420 having been fed through the first longitudinal slot 454 of the first curling rod 450, and the second longitudinal slot 455 of the second curling rod 451. The sheet of cohesive paper 420 having been previously cut by the cutter 426 into three widths. In FIG. 26B, the leading end of the width-cut sheet of cohesive paper 420 has been wound about the second curling rod 451 by rotation of the second curling rod 451 to create the first curls 406*a*, 406*b*, 406*c*. In FIG. 26C, the sheet of cohesive paper has been cut by the sheet cutter 452 into a strip of cohesive paper 400. In FIG. 26D, the width-dimensioned strip of cohesive paper 400 has been wound about the first curling rod 450 by rotation of the first curling rod 450. In FIG. 26E, the first curling rod 450 has moved towards the second curling rod 451 and has been further rotated in order to tighten up the formed "B". In FIG. 26F, the three formed "B"s 404*a*, 404*b*, 404*c* are being ejected from the first and second curling rods 450, 451 by the sliding ejection bar 457.

It should be appreciated that other manners of producing packing product, "B"s, or modified "B"s, in accordance with the present principles may be used, and are contemplated.

While the invention has been illustrated and described in detail in the drawings and foregoing description, the same is to be considered as illustrative and not restrictive in character, it being understood that only preferred embodiments have been shown and described, and that all changes and modifications that come within the spirit of the invention are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention.

What is claimed is:

1. A packing product comprising:

a dimension controlled strip of cohesive paper having a cohesive side, a non-cohesive side, a width, a length, a leading end, and a trailing end;

a first curl formed of a first plurality of winds at the leading end of the dimension controlled strip of cohesive paper, the first plurality of winds comprising at least two 360° rotations with the cohesive side of the first curl facing radially outward;

a second curl formed of a second plurality of winds at the trailing end of the dimension controlled strip of cohesive paper, the second plurality of winds being at least two 360° rotations with the cohesive side of the first curl facing radially outward; and a segment connecting the first curl with the second curl.

2. The packing product of claim 1, wherein:

the first plurality of winds of the first curl is formed in a first rotational direction; and the second plurality of winds of the second curl is formed in a second rotational direction that is opposite the first rotational direction.

3. The packing product of claim 2, wherein the dimension controlled strip of paper comprises a dimension controlled strip of coated cohesive paper.

4. The packing product of claim 3, wherein:

the first curl has a first curl diameter;

the second curl has a second curl diameter; and the segment connecting the first curl with the second curl is sized such that the first and second curls abut at a mutual tangent to the cohesive side of the first curl diameter of the first curl and to the cohesive side of the second curl diameter of the second curl.

5. The packing product of claim 4, wherein the first curl diameter is equal to the second curl diameter.

6. The packing product of claim 4, wherein the first curl diameter is different than the second curl diameter.

* * * * *